(12) United States Patent
Kim

(10) Patent No.: US 12,373,336 B2
(45) Date of Patent: Jul. 29, 2025

(54) STORAGE SYSTEM AND METHOD OF OPERATING THE STORAGE SYSTEM

(71) Applicant: Samsung Electronics Co., Ltd., Suwon-si (KR)

(72) Inventor: Hyunjin Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/183,592

(22) Filed: Mar. 14, 2023

(65) Prior Publication Data
US 2024/0028507 A1 Jan. 25, 2024

(30) Foreign Application Priority Data

Jul. 19, 2022 (KR) .................. 10-2022-0088744

(51) Int. Cl.
*G06F 12/10* (2016.01)
*G06F 12/02* (2006.01)

(52) U.S. Cl.
CPC .......... *G06F 12/0246* (2013.01); *G06F 12/10* (2013.01); *G06F 2212/7205* (2013.01); *G06F 2212/7211* (2013.01)

(58) Field of Classification Search
CPC ............... G06F 12/0246; G06F 12/10; G06F 2212/7205; G06F 2212/7211; G06F 2212/1041; G06F 2212/7208; G06F 3/0659; G06F 2212/7201; G06F 2212/7203; G06F 3/0641
USPC ....................................................... 711/103
See application file for complete search history.

(56) References Cited

U.S. PATENT DOCUMENTS

| | | | |
|---|---|---|---|
| 10,725,871 B2 | 7/2020 | Park et al. | |
| 11,042,478 B2 | 6/2021 | Sabol et al. | |
| 11,061,604 B2 | 7/2021 | Chou et al. | |
| 11,281,577 B1 | 3/2022 | Karumbunathan et al. | |
| 11,301,374 B2 | 4/2022 | Wallace | |
| 2018/0232325 A1* | 8/2018 | Choi | G06F 3/061 |
| 2019/0196955 A1 | 6/2019 | Chang et al. | |
| 2020/0117520 A1* | 4/2020 | Costa | G06F 3/0604 |
| 2021/0026567 A1* | 1/2021 | Lim | G06F 3/0679 |
| 2021/0294742 A1* | 9/2021 | Yamamoto | G06F 11/1076 |
| 2021/0303173 A1* | 9/2021 | Wu | G06F 3/0611 |
| 2021/0374080 A1* | 12/2021 | Horwich | G06F 12/0862 |
| 2023/0061338 A1* | 3/2023 | Veluswamy | G06F 12/0246 |
| 2023/0325106 A1* | 10/2023 | Shveidel | G06F 3/0638 |
| | | | 711/202 |

FOREIGN PATENT DOCUMENTS

KR        102365312 B1    2/2022

* cited by examiner

*Primary Examiner* — Jared I Rutz
*Assistant Examiner* — Wei Ma
(74) *Attorney, Agent, or Firm* — Harness, Dickey & Pierce, P.L.C.

(57) ABSTRACT

A storage system includes a plurality of storage devices. Each of the plurality of storage devices includes a nonvolatile memory device, a buffer memory and a memory controller that controls the nonvolatile memory device and the buffer memory. At least one storage device of the plurality of storage devices is a computational storage device. The computational storage device further includes a storage controller that performs a computational operation for controlling the storage system.

20 Claims, 18 Drawing Sheets

FIG. 6

| HOST LOGICAL ADDRESS | STORAGE IDENTIFIER | STORAGE LOGICAL ADDRESS |
|---|---|---|
| LA1 | SSD1 | LA2 |
| ... | ... | ... |

FIG. 12

| HOST LOGICAL ADDRESS | STORAGE IDENTIFIER | STORAGE PHYSICAL ADDRESS |
|---|---|---|
| LA | OC_SSD1 | PA |
| ... | ... | ... |

STORAGE SYSTEM AND METHOD OF OPERATING THE STORAGE SYSTEM

CROSS-REFERENCE TO RELATED APPLICATION

This application claims priority under 35 USC § 119 to Korean Patent Application No. 10-2022-0088744 filed on Jul. 19, 2022 in the Korean Intellectual Property Office (KIPO), the contents of which are herein incorporated by reference in their entirety.

BACKGROUND

1. Technical Field

Example embodiments relate generally to semiconductor integrated circuits, and more particularly to storage systems and methods of operating the storage systems.

2. Description of the Related Art

A storage system, such as a storage area network (SAN) system, a network attached storage (NAS) system, etc., may be used to securely and rapidly store massive data in a server environment or a cloud environment.

The storage system may include a plurality of storage devices to store data. The storage system may further include a central processing unit to provide storage services, such as address management (or mapping management), redundant array of independent disks (RAID), erasure coding, de-duplication, compression, etc.

SUMMARY

At least one example embodiment of the present disclosure provides storage systems in which at least one of a plurality of storage devices manages the storage system without a separate central processing unit.

At least one example embodiment of the present disclosure provides methods of operating storage systems in which at least one of a plurality of storage devices manages the storage system without a separate central processing unit.

According to example embodiments, a storage system includes a plurality of storage devices. Each of the plurality of storage devices includes a nonvolatile memory device, a buffer memory and a memory controller configured to control the nonvolatile memory device and the buffer memory. At least one storage device of the plurality of storage devices is a computational storage device further including a storage controller configured to perform a computational operation for managing the storage system.

According to example embodiments, in a method of operating a storage system including a computational storage device and normal storage devices, the computational storage device receives a host request from a host, and the computational storage device controls the normal storage devices in response to the host request.

According to example embodiments, a storage system includes normal storage devices, each of the normal storage devices including a first nonvolatile memory device, a first buffer memory and a first memory controller configured to control the first nonvolatile memory device and the first buffer memory, and a computational storage device including a second nonvolatile memory device, a second buffer memory, a second memory controller configured to control the second nonvolatile memory device and the second buffer memory, and a storage controller configured to perform a computational operation for managing the storage system. The computational storage device configured to receive a read request from a host, control a first normal storage device of the normal storage devices in response to the read request such that the first normal storage device performs a read operation that reads read data from the first nonvolatile memory device of the first normal storage device, and provide the host with the read data that are read from the first nonvolatile memory device of the first normal storage device. The computational storage device configured to receive a write request including write data from the host, control a second normal storage device of the normal storage devices in response to the write request such that the second normal storage device performs a write operation that writes the write data to the first nonvolatile memory device of the second normal storage device, and provide the host with a completion response to the write request.

In a storage system and a method of operating the storage system according to example embodiments, at least one of a plurality of storage devices may be a computational storage device, and the computational storage device may include a storage controller for managing the storage system. Accordingly, the storage system may be configured without a separate central processing unit for managing the storage system, and a cost and a size of the storage system may be reduced.

BRIEF DESCRIPTION OF THE DRAWINGS

Illustrative, non-limiting example embodiments will be more clearly understood from the following detailed description taken in conjunction with the accompanying drawings.

FIG. 6 is a diagram illustrating an example of a storage mapping table included in a buffer memory of a computational storage device.

FIG. 12 is a diagram illustrating another example of a storage mapping table included in a buffer memory of a computational storage device.

DETAILED DESCRIPTION OF THE EMBODIMENTS

Figure 1:
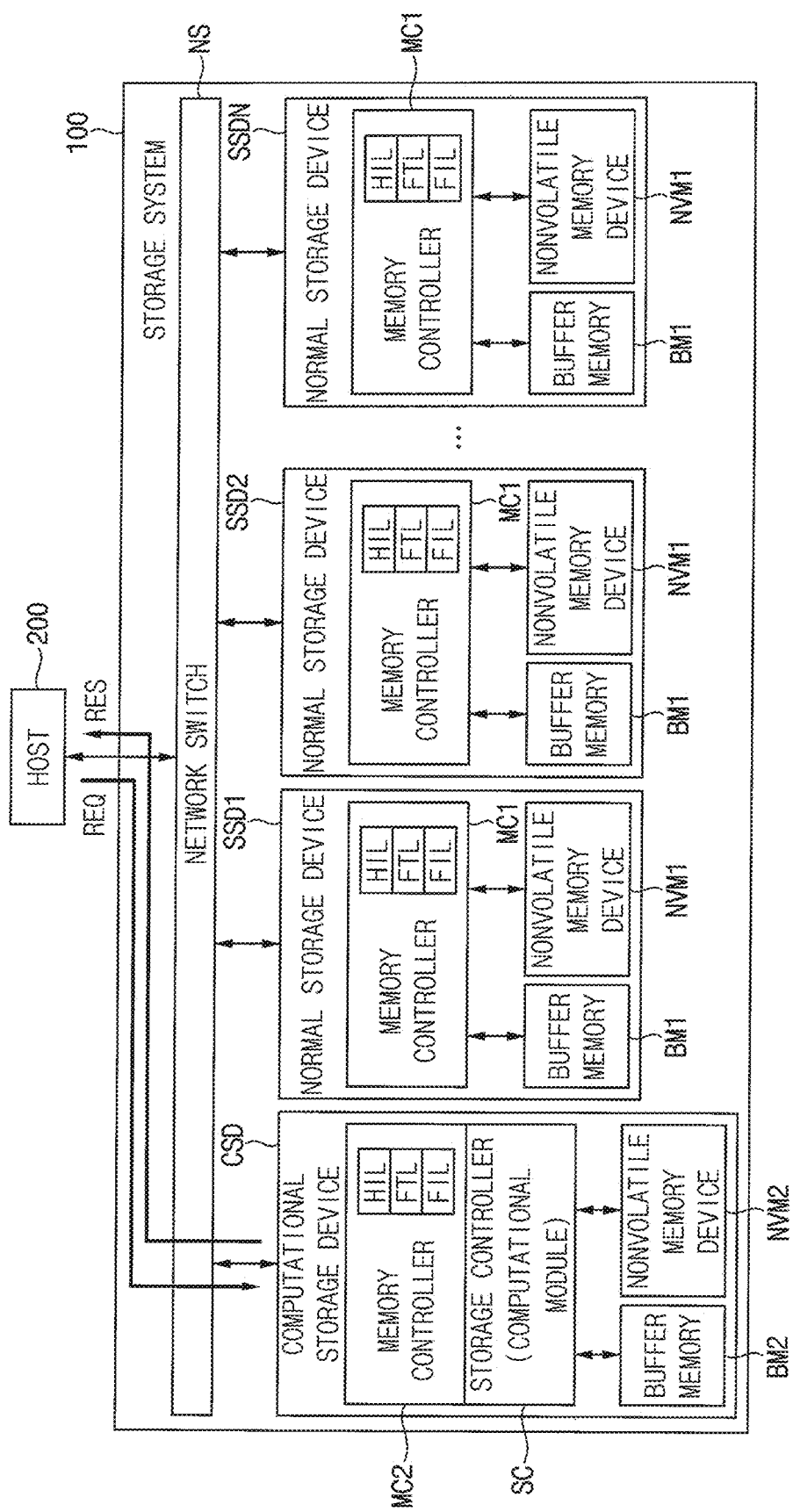
FIG. 1 is a block diagram illustrating a storage system according to example embodiments.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

Figure 2:
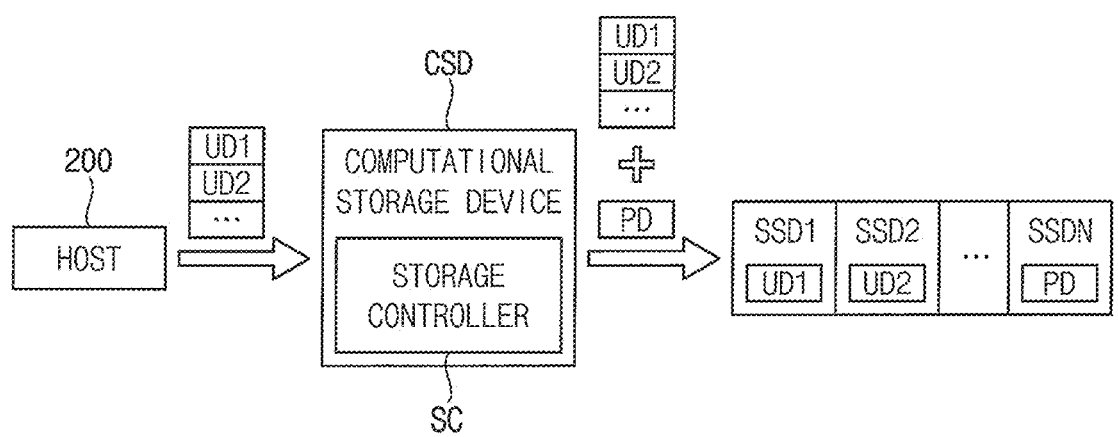
FIG. 2 is a diagram for describing an example of a storage system in which a computational storage device provides a redundant array of independent disks (RAID) storage service.

FIG. 1 is a block diagram illustrating a storage system according to example embodiments, and FIG. 2 is a diagram for describing an example of a storage system in which a computational storage device provides a redundant array of independent disks (RAID) storage service.

Referring to FIG. 1, a storage system 100 may include a plurality of storage devices CSD, SSD1, SSD2, . . . , SSDN. In some example embodiments, the storage system 100 may further include a network switch NS.

In the storage system 100 according to example embodiments, at least one storage device CSD of the plurality of storage devices CSD, SSD1, SSD2, . . . , SSDN may be a computational storage device CSD that includes a storage controller SC, and the remaining storage devices SSD1, SSD2, . . . , SSDN may be normal storage devices SSD1, SSD2, . . . , SSDN that do not include the storage controller SC.

Each normal storage device SSD1, SSD2, . . . , SSDN may include a first nonvolatile memory device NVM1, a first buffer memory BM1 and a first memory controller MC1 that controls the first nonvolatile memory device NVM1 and the first buffer memory BM1.

The first nonvolatile memory device NVM1 may be controlled by the first memory controller MC1 to store data. In some example embodiments, the first nonvolatile memory device NVM1 may be implemented with, but not limited to, a NAND flash memory. In other example embodiments, the first nonvolatile memory device NVM1 may be implemented with an electrically erasable programmable read-only memory (EEPROM), a phase change random access memory (PRAM), a resistive random access memory (RRAM), a nano floating gate memory (NFGM), a polymer random access memory (PoRAM), a magnetic random access memory (MRAM), a ferroelectric random access memory (FRAM), and/or the like.

The first buffer memory BM1 may temporarily store write data that are to be written to the first nonvolatile memory device NVM1, or read data that are read from the first nonvolatile memory device NVM1. The first buffer memory BM1 may include a mapping table for the first nonvolatile memory device NVM1. In some example embodiments, the first buffer memory BM1 may implemented with, but not limited to, a volatile memory device, such as a dynamic random access memory (DRAM) or a static random access memory (SRAM). Further, in some example embodiments, the first buffer memory BM1 may be implemented as a separate semiconductor chip located outside the first memory controller MC1. In other example embodiments, the first buffer memory BM1 may be located inside the first memory controller MC1.

The first memory controller MC1 may control the first nonvolatile memory device NVM1 and the first buffer memory BM1. For example, the first memory controller MC1 may perform a read operation that reads read data from the first nonvolatile memory device NVM1 and stores the read data in the first buffer memory BM1, or may perform a write operation that writes write data stored in the first buffer memory BM1 to the first nonvolatile memory device NVM1. In some example embodiments, the first memory controller MC1 may include or execute a host interface layer HIL, a flash translation layer FTL and a flash interface layer FIL.

The host interface layer HIL may transmit and receive packets to and from an external device (e.g., the computational storage device CSD). A packet transmitted from the external device to the host interface layer HIL may include a command or the write data to be written to the first nonvolatile memory device NVM1. A packet transmitted from the host interface layer HIL to the external device may include a response to the command or the read data read from the first nonvolatile memory device NVM1. The flash interface layer FIL may transmit the write data to the first nonvolatile memory device NVM1, or may receive the read data from the first nonvolatile memory device NVM1. In some example embodiments, the flash interface layer FIL may be configured to comply with a standard protocol, such as Toggle or open NAND flash interface (ONFI).

The flash translation layer FTL may perform various functions, such as an address mapping operation, a wear-leveling operation, and/or a garbage collection operation. The address mapping operation may be an operation of converting a logical address received from the external device into a physical address used to actually store data in the first nonvolatile memory device NVM1. To perform the address mapping operation, the flash translation layer FTL may manage the mapping table in the first buffer memory BM1. The wear-leveling operation may be a technique for reducing or preventing excessive deterioration of a specific block by allowing blocks of the first nonvolatile memory device NVM1 to be uniformly used. As an example, the wear-leveling operation may be implemented using a firmware technique that balances erase counts of physical blocks. The garbage collection operation may be a technique for ensuring usable capacity in the first nonvolatile memory device NVM1 by erasing an existing block after copying valid data of the existing block to a new block.

The computational storage device CSD may not only include a second nonvolatile memory device NVM2, a second buffer memory BM2 and a second memory controller MC2 respectively corresponding to the first nonvolatile memory device NVM1, the first buffer memory BM1 and the first memory controller MC1, but also include a computational module or the storage controller SC that performs a computational operation.

In some example embodiments, similarly to the first nonvolatile memory device NVM1, the second nonvolatile memory device NVM2 may be implemented with a NAND flash memory, an EEPROM, a PRAM, an RRAM, a NFGM, a PoRAM, an MRAM, an FRAM, or the like. In other example embodiments, the second nonvolatile memory device NVM2 may be implemented with a memory having a high speed faster than the first nonvolatile memory device NVM1. For example, the first nonvolatile memory device NVM1 may be implemented with a triple-level cell (TLC) flash memory, and the second nonvolatile memory device NVM2 may be implemented with a single level cell (SLC) flash memory, a multi-level cell (MLC) flash memory, a Z-NAND flash memory, a PRAM or an MRAM. Further, in some example embodiments, similarly to the first buffer memory BM1, the second buffer memory BM2 may be implemented with a volatile memory device, such as a DRAM or an SRAM. In some example embodiments, the second memory controller MC2 and the storage controller SC may be implemented as a single integrated circuit. In other example embodiments, the second memory controller MC2 and the storage controller SC may be implemented as separate integrated circuits, respectively.

The storage controller SC may perform a computational operation for managing the storage system 100. Thus, the storage system 100 according to example embodiments may be configured without a separate central processing unit for managing the storage system 100 or for providing a storage service, and the computational module of the computational storage device CSD may serve as the storage controller SC for providing the storage service.

In some example embodiments, the storage controller SC may perform address management (or mapping management) for the normal storage devices SSD1, SSD2, ..., SSDN. For example, as described below with reference to FIGS. 5 and 6, the storage controller SC may manage a storage mapping table SMT in the second buffer memory BM2, and may convert a logical address for a host 200 into a logical address for the normal storage devices SSD1, SSD2, ..., SSDN by using the storage mapping table SMT. In another example, as described below with reference to FIGS. 11 and 12, the storage controller SC may manage a storage mapping table SMT' in the second buffer memory BM2, and may convert the logical address for the host 200 into a physical address for the normal storage devices SSD1, SSD2, ..., SSDN by using the storage mapping table SMT'.

In other example embodiments, the storage controller SC may perform a parity generating computational operation for data recovery. For example, the storage controller SC may perform a RAID computational operation or an erasure coding computational operation. As illustrated in FIG. 2, the computational storage device CSD may receive a plurality of user data UD1, UD2, ... as write data to be written to the storage system 100 from the host 200, and the storage controller SC may perform a computational operation that generates parity data PD for the plurality of user data UD1, UD2, .... For example, the storage controller SC may perform, but not limited to, an XOR operation or a Reed-Solomon operation on the plurality of user data UD1, UD2, ... to generate the parity data PD. Further, the computational storage device CSD may store the plurality of user data UD1, UD2, ... and the parity data PD in the normal storage devices SSD1, SSD2, ..., SSDN, respectively. In this case, even if an error or a failure occurs in at least one of the normal storage devices SSD1, SSD2, ..., SSDN, original data may be recovered by using the parity data PD.

In still other example embodiments, the storage controller SC may perform a data de-duplication computational operation. For example, in a case where write data that are the same as data stored in the normal storage devices SSD1, SSD2, ..., SSDN are received, the storage controller SC may not write the write data to the normal storage devices SSD1, SSD2, ..., SSDN. In another example, the storage controller SC may remove duplicated data stored in the normal storage devices SSD1, SSD2, ..., SSDN in an idle time.

In still other example embodiments, the storage controller SC may perform a compression computational operation. For example, the storage controller SC may perform a compression computational operation on data received from the host 200, and may store compressed data in the normal storage devices SSD1, SSD2, ..., SSDN. Further, the storage controller SC may perform a decompression computational operation on data read in the normal storage devices SSD1, SSD2, ..., SSDN, and may provide decompressed data to the host 200.

Although examples where the storage controller SC performs the address management (or the mapping management), the parity generating computational operation, the data de-duplication computational operation, and/or the compression computational operation are described above, the computational operation of the storage controller SC is not limited to examples described above, and the computational storage device CSD of the storage system 100 according to example embodiments may perform any computational operation for providing the storage service.

The network switch NS may provide a communication path between the computational storage device CSD and the normal storage devices SSD1, SSD2, ..., SSDN, and may provide a communication path between the host 200 and the computational storage device CSD. In some example embodiments, the computational storage device CSD and the normal storage devices SSD1, SSD2, ..., SSDN may communicate via the network switch NS using, but not limited to, a nonvolatile memory express (NVMe) protocol. Further, in some example embodiments, the host 200 and the computational storage device CSD may communicate via the network switch NS using a communication protocol substantially the same as a communication protocol (e.g., the NVMe protocol) between the computational storage device CSD and the normal storage devices SSD1, SSD2, ..., SSDN. In other example embodiments, the host 200 and the computational storage device CSD may communicate via the network switch NS using a communication protocol different from the communication protocol between the computational storage device CSD and the normal storage devices SSD1, SSD2, ..., SSDN. In this case, the storage system 100 may further include a network interface card (NIC) for converting between the communication protocol between the host 200 and the computational storage device CSD and the communication protocol between the computational storage device CSD and the normal storage devices SSD1, SSD2, ..., SSDN.

In the storage system 100 according to example embodiments, only the computational storage device CSD among the plurality of storage devices CSD, SSD1, SSD2, ..., SSDN may communicate with the host 200. Thus, the computational storage device CSD may receive a host request REQ from the host 200, and may control the normal storage devices SSD1, SSD2, ..., SSDN to perform an operation requested by the host request REQ in response to the host request REQ. Unlike the computational storage device CSD, the normal storage devices SSD1, SSD2, ..., SSDN may not directly communicate with the host 200, and may not directly receive the host request REQ from the host 200. Once the operation requested by the host request REQ is completed, the computational storage device CSD may provide a completion response RES to the host 200.

As described above, in the storage system 100 according to example embodiments, the computational storage device CSD or the storage controller SC of the computational storage device CSD may manage the storage system 100, and may provide the storage service. Accordingly, the storage system 100 may be configured without a separate central processing unit for managing the storage system 100, and a cost and a size of the storage system 100 may be reduced.

Figure 3:
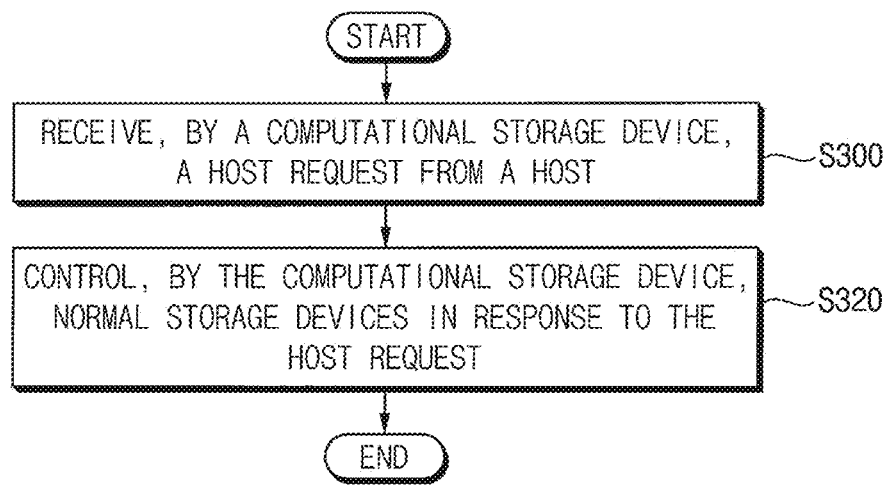
FIG. 3 is a flowchart illustrating a method of operating a storage system according to example embodiments.

FIG. 3 is a flowchart illustrating a method of operating a storage system according to example embodiments.

Referring to FIGS. 1 and 3, in a method of operating a storage system 100 including a computational storage device CSD and normal storage devices SSD1, SSD2, . . . , SSDN, the computational storage device CSD may receive a host request REQ from a host 200 (step S300). For example, the computational storage device CSD may receive a read request or a write request from the host 200.

The computational storage device CSD may control the normal storage devices SSD1, SSD2, . . . , SSDN in response to the host request REQ (step S320). For example, in a case where the host request REQ is the read request, the computational storage device CSD may determine a first normal storage device SSD1 storing read data requested by the read request among the normal storage devices SSD1, SSD2, . . . , SSDN, and may control the first normal storage device SSD1 such that the first normal storage device SSD1 performs a read operation that reads the read data from a first nonvolatile memory device NVM1 of the first normal storage device SSD1. In another example, in a case where the host request REQ is the write request, the computational storage device CSD may determine a second normal storage device SSD2 to which write data requested by the write request are to be written among the normal storage devices SSD1, SSD2, . . . , SSDN, and may control the second normal storage device SSD2 such that the second normal storage device SSD2 performs a write operation that writes the write data to a first nonvolatile memory device NVM1 of the second normal storage device SSD2.

Figure 4:
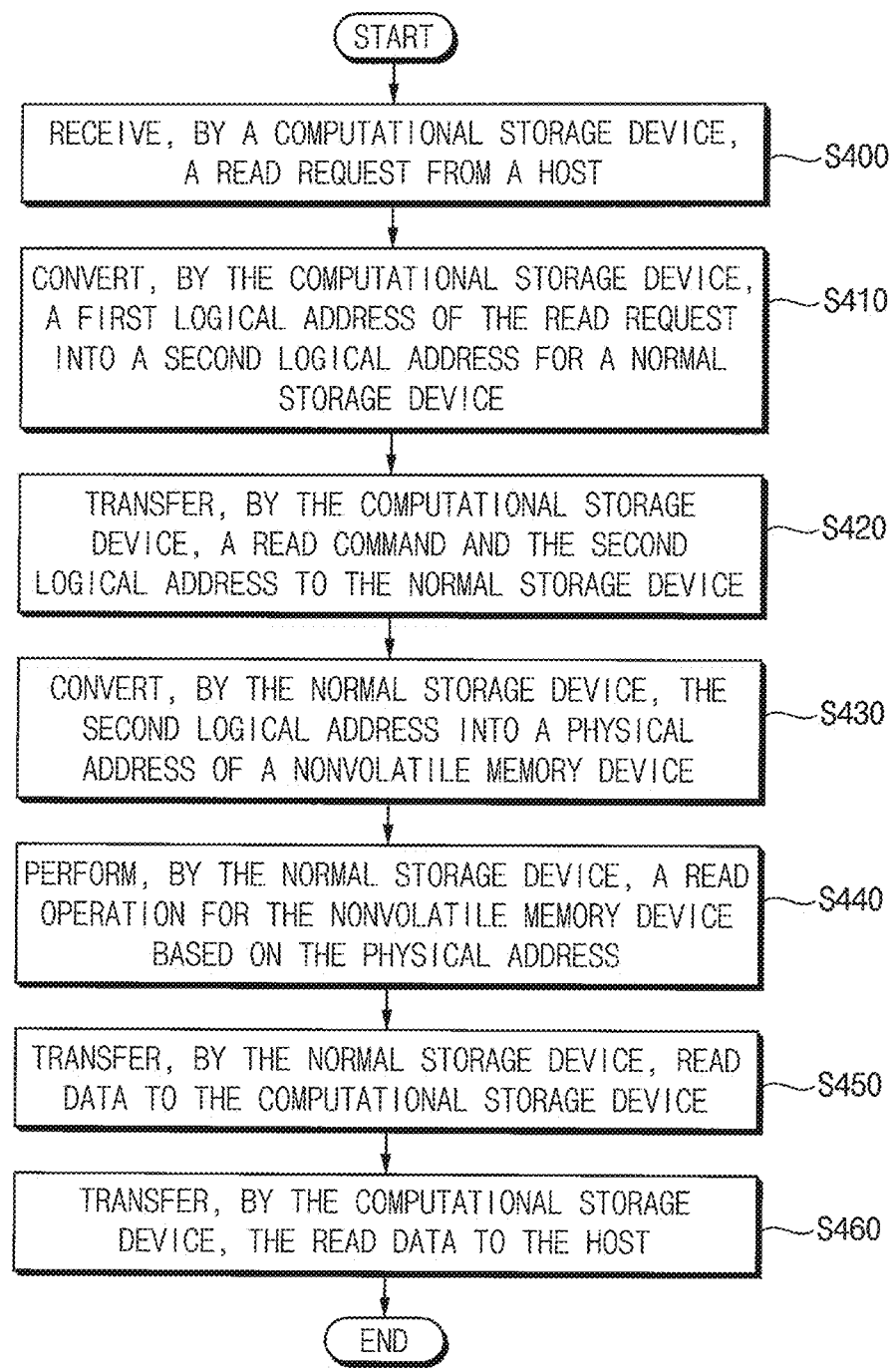
FIG. 4 is a flowchart illustrating a method of reading data in a storage system according to example embodiments.
Figure 5:
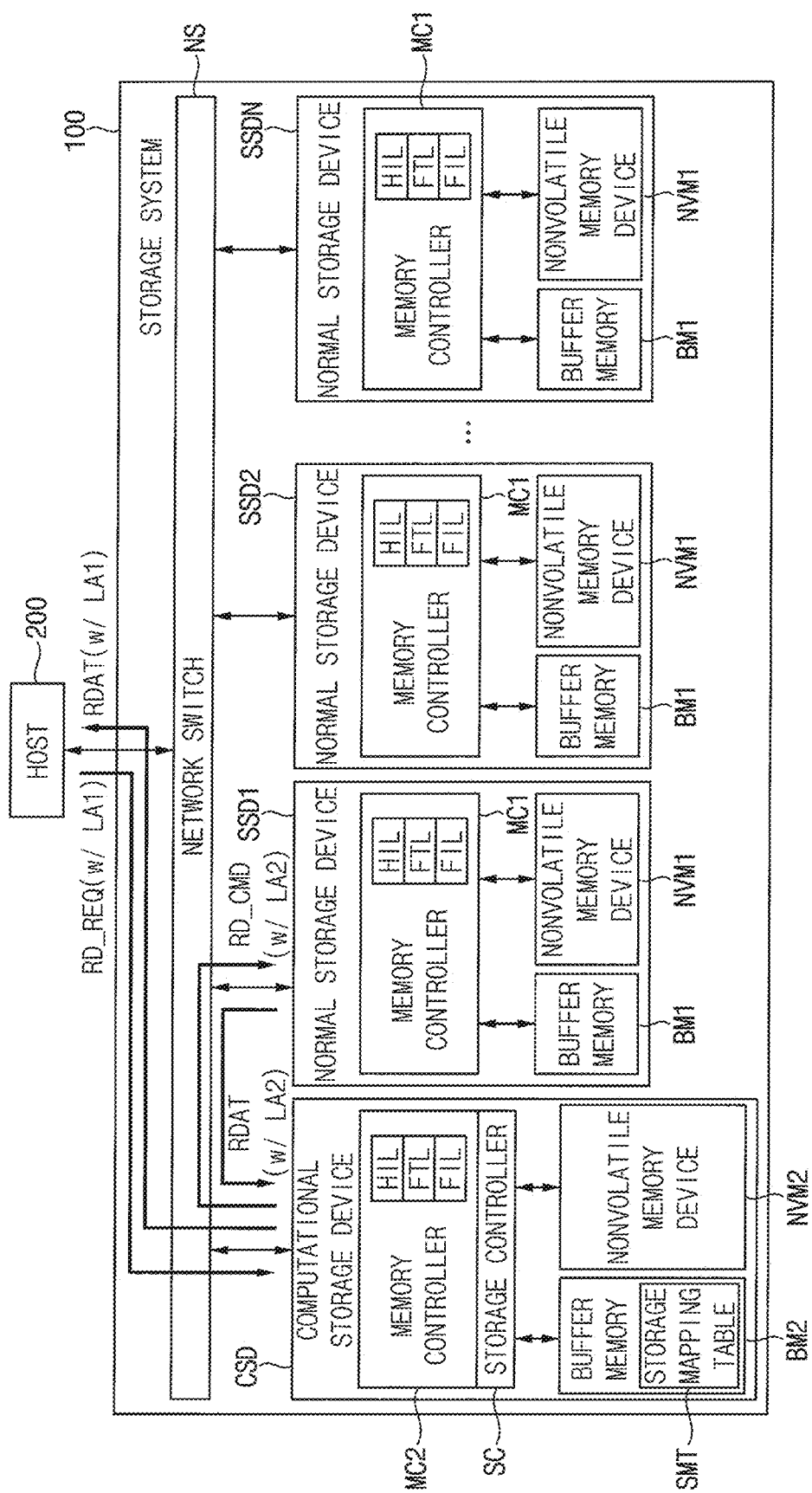
FIG. 5 is a block diagram for describing an example of a storage system that reads data according to example embodiments.

FIG. 4 is a flowchart illustrating a method of reading data in a storage system according to example embodiments, FIG. 5 is a block diagram for describing an example of a storage system that reads data according to example embodiments, and FIG. 6 is a diagram illustrating an example of a storage mapping table included in a buffer memory of a computational storage device.

Referring to FIGS. 4 and 5, a computational storage device CSD may receive a read request RD_REQ from a host 200 (step S400). The read request RD_REQ received from the host 200 may include a read command RD_CMD and a first logical address LA1 for the host 200.

The computational storage device CSD may control a normal storage device SSD1 in response to the read request RD_REQ such that the normal storage device SSD1 performs a read operation that reads read data RDAT from a nonvolatile memory device NVM1 of the normal storage device SSD1 (step S410 through step S450).

To perform the read operation, the computational storage device CSD may determine the normal storage device SSD1 storing the read data RDAT requested by the read request RD_REQ, and may convert the first logical address LA1 for the host 200 into a second logical address LA2 for the normal storage device SSD1 (step S410). In some example embodiments, a buffer memory BM2 of the computational storage device CSD may include not only a mapping table for a nonvolatile memory device NVM2 of the computational storage device CSD, not only a storage mapping table SMT that is used in converting the first logical address LA1 for the host 200 into the second logical address LA2 for the normal storage device SSD1. For example, as illustrated in FIG. 6, the storage mapping table SMT may store the first logical address LA1 for the host 200, a storage identifier representing the normal storage device SSD1 in which the read data RDAT corresponding to the first logical address LA1 are stored, and the second logical address LA2 for the normal storage device SSD1 corresponding to the first logical address LA1. By using the storage mapping table SMT, the computational storage device CSD may determine the normal storage device SSD1 storing the read data RDAT requested by the read request RD_REQ having the first logical address LA1, and may convert the first logical address LA1 of the read request RD_REQ into the second logical address LA2 for the normal storage device SSD1.

The computational storage device CSD may provide the read command RD_CMD and the second logical address LA2 to the normal storage device SSD1 via a network switch NS (step S420). In response to the read command RD_CMD, the normal storage device SSD1 may convert the second logical address LA2 into a physical address of the nonvolatile memory device NVM1 of the normal storage device SSD1 by using a mapping table in a buffer memory BM1 of the normal storage device SSD1 (step S430), and may perform the read operation that reads the read data RDAT from the nonvolatile memory device NVM1 based on the physical address (step S440). For example, the normal storage device SSD1 may store the read data RDAT in the buffer memory BM1 by reading the read data RDAT from a region having the physical address within the nonvolatile memory device NVM1. The normal storage device SSD1 may transfer the read data RDAT along with the second logical address LA2 to the computational storage device CSD (step S450).

The computational storage device CSD may convert the second logical address LA2 for the normal storage device SSD1 into the first logical address LA1 for the host 200, and may provide the host 200 with the read data RDAT that are read from the nonvolatile memory device NVM1 of the normal storage device SSD1 along with the first logical address LA1 (step S460).

Figure 7:
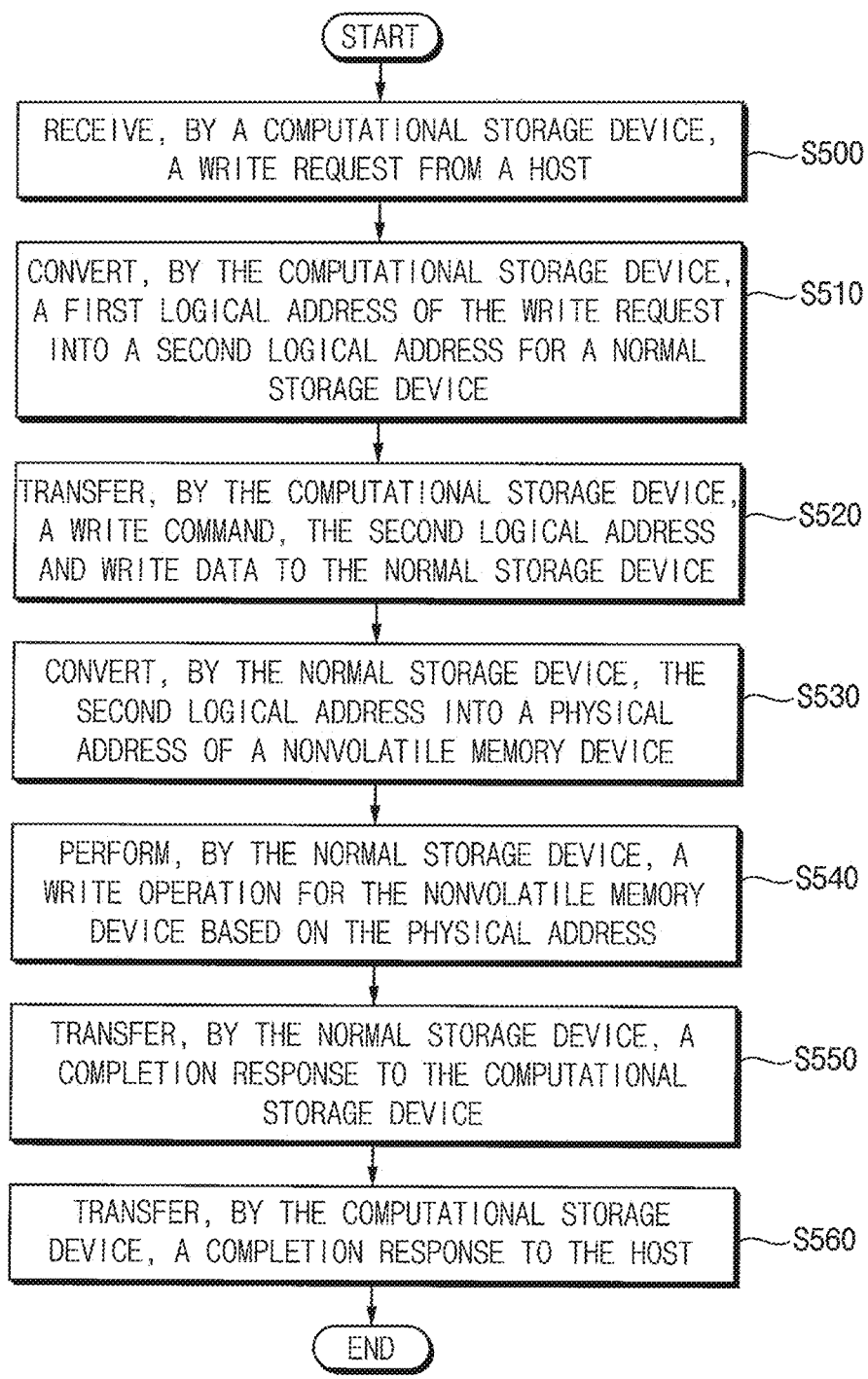
FIG. 7 is a flowchart illustrating a method of writing data in a storage system according to example embodiments.
Figure 8:
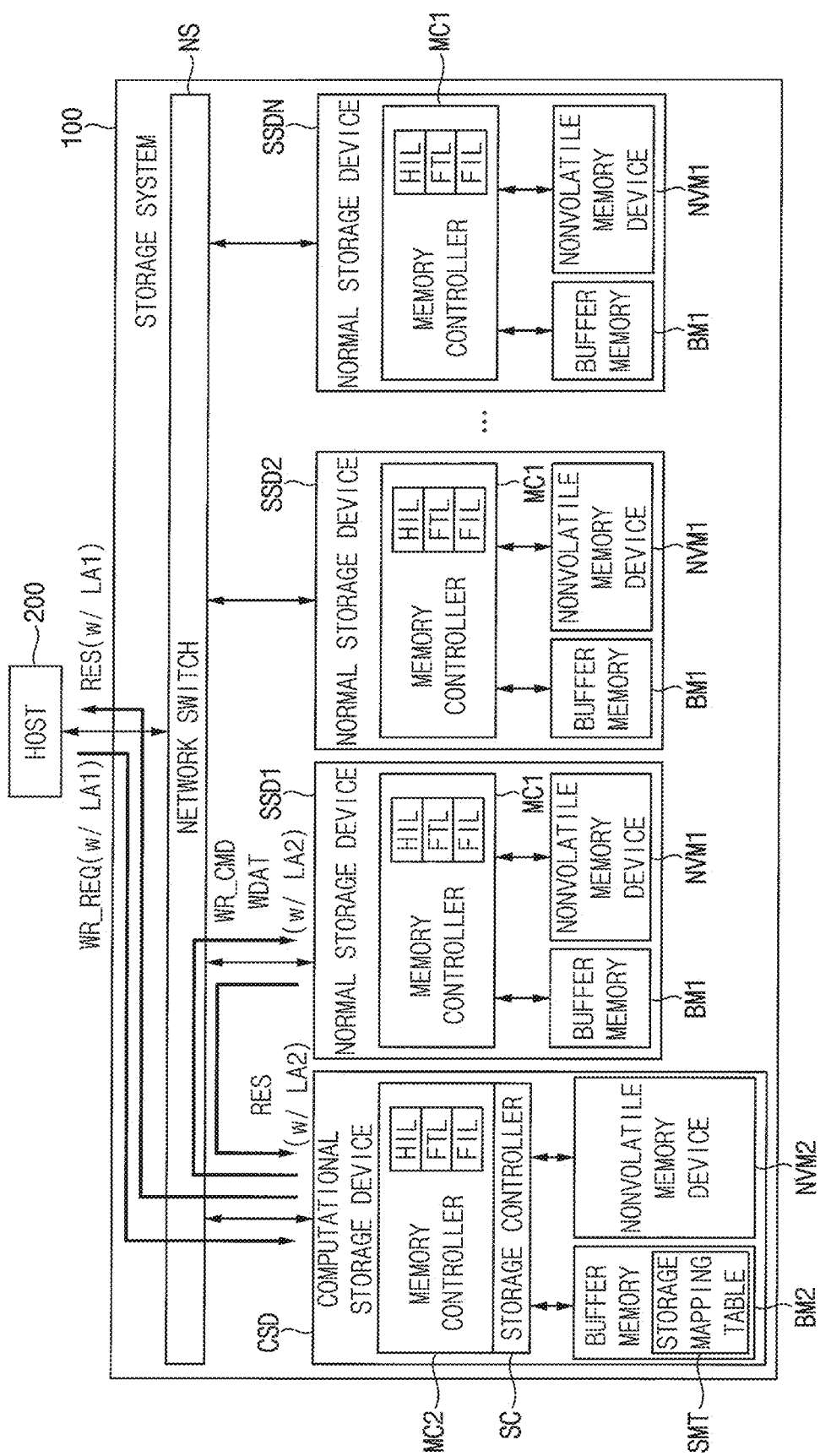
FIG. 8 is a block diagram for describing an example of a storage system that writes data according to example embodiments.

FIG. 7 is a flowchart illustrating a method of writing data in a storage system according to example embodiments, and FIG. 8 is a block diagram for describing an example of a storage system that writes data according to example embodiments.

Referring to FIGS. 7 and 8, a computational storage device CSD may receive a write request WR_REQ from a host 200 (step S500). The write request WR_REQ received from the host 200 may include a write command WR_CMD, write data WDAT and a first logical address LA1 for the host 200.

The computational storage device CSD may control a normal storage device SSD1 in response to the write request WR_REQ such that the normal storage device SSD1 performs a write operation that writes the write data WDAT to a nonvolatile memory device NVM1 of the normal storage device SSD1 (step S510 through step S550).

To perform the write operation, the computational storage device CSD may determine the normal storage device SSD1 to which the write data WDAT of the write request WR_REQ are to be written, and may convert the first logical address LA1 for the host 200 into a second logical address LA2 for the normal storage device SSD1 (step S510). In some example embodiments, the computational storage device CSD may sequentially select normal storage devices SSD1, SSD2, . . . , SSDN as the normal storage device SSD1 to which the write data WDAT are to be written. In other example embodiments, the computational storage device CSD may determine the normal storage device SSD1 to which the write data WDAT are to be written by considering storage spaces, loads, etc. of the normal storage devices SSD1, SSD2, . . . , SSDN. If the normal storage device SSD1 to which the write data WDAT are to be written is determined, the computational storage device CSD may convert the first logical address LA1 of the write request WR_REQ into the second logical address LA2 for the normal storage device SSD1 by using a storage mapping table SMT.

The computational storage device CSD may provide the write command WR_CMD, the write data WDAT and the second logical address LA2 to the normal storage device SSD1 via a network switch NS (step S520). In response to the write command WR_CMD, the normal storage device SSD1 may convert the second logical address LA2 into a physical address of the nonvolatile memory device NVM1 of the normal storage device SSD1 by using a mapping table in a buffer memory BM1 of the normal storage device SSD1 (step S530), and may perform the write operation that writes the write data WDAT to the nonvolatile memory device NVM1 based on the physical address (step S540). For example, the normal storage device SSD1 may write the write data WDAT to a region having the physical address within the nonvolatile memory device NVM1. The normal storage device SSD1 may transfer a completion response RES indicating that the write operation is completed along with the second logical address LA2 to the computational storage device CSD (step S550).

The computational storage device CSD may convert the second logical address LA2 for the normal storage device SSD1 into the first logical address LA1 for the host 200, and may provide the host 200 with a completion response RES indicating that the write operation corresponding to the write request WR_REQ is completed along with the first logical address LA1 (step S560).

Figure 9:
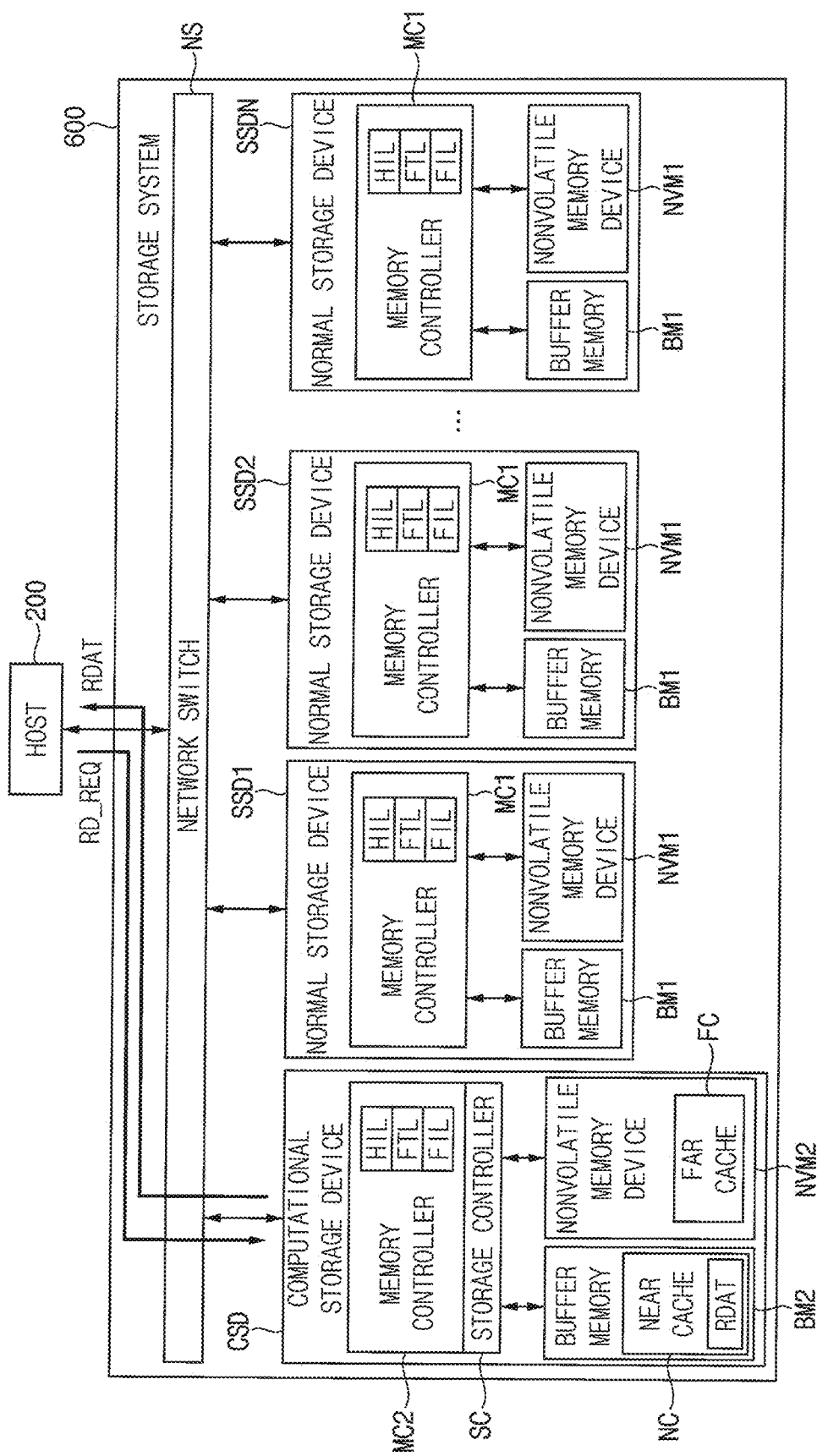
FIG. 9 is a block diagram illustrating a storage system according to example embodiments.

FIG. 9 is a block diagram illustrating a storage system according to example embodiments.

Referring to FIG. 9, a storage system 600 may include a computational storage device CSD, normal storage devices SSD1, SSD2, . . . , SSDN and a network switch NS. The computational storage device CSD may include a nonvolatile memory device NVM2, a buffer memory BM2, a memory controller MC2 and a storage controller SC. The storage system 600 of FIG. 9 may have a similar configuration and a similar operation to a storage system 100 of FIG. 1, except that at least one of the buffer memory BM2 and the nonvolatile memory device NVM2 of the computational storage device CSD may be used as a cache memory.

In some example embodiments, the computational storage device CSD or the storage controller SC may use the buffer memory BM2 as the cache memory. In a case where read data RDAT requested by a read request RD_REQ of a host 200 exist in the buffer memory BM2, the computational storage device CSD may provide the host 200 with the read data RDAT stored in the buffer memory BM2 without performing a read operation by the normal storage devices SSD1, SSD2, . . . , SSDN.

In other example embodiments, the computational storage device CSD or the storage controller SC may use the nonvolatile memory device NVM2 as the cache memory. In a case where the read data RDAT requested by the read request RD_REQ of the host 200 exist in the nonvolatile memory device NVM2, without performing the read operation by the normal storage devices SSD1, SSD2, . . . , SSDN, the computational storage device CSD may read the read data RDAT from the nonvolatile memory device NVM2, and provide the host 200 with the read data RDAT that are read from the nonvolatile memory device NVM2 of the computational storage device CSD.

In still other example embodiments, the computational storage device CSD or the storage controller SC may use both of the buffer memory BM2 and the nonvolatile memory device NVM2 as the cache memories. In this case, at least a portion of the buffer memory BM2 may be used as a near cache memory NC, and at least a portion of the nonvolatile memory device NVM2 may be used as a far cache memory FC. If the read request RD_REQ is received, the computational storage device CSD may first determine whether the read data RDAT requested by the read request RD_REQ exist in the buffer memory BM2. If the read data RDAT do not exist in the buffer memory BM2, the computational storage device CSD may further determine whether the read data RDAT requested by the read request RD_REQ exist in the nonvolatile memory device NVM2. In a case where the read data RDAT exist in the buffer memory BM2 and/or the nonvolatile memory device NVM2, the computational storage device CSD may provide the host 200 with the read data RDAT without performing the read operation by the normal storage devices SSD1, SSD2, . . . , SSDN.

Figure 10:
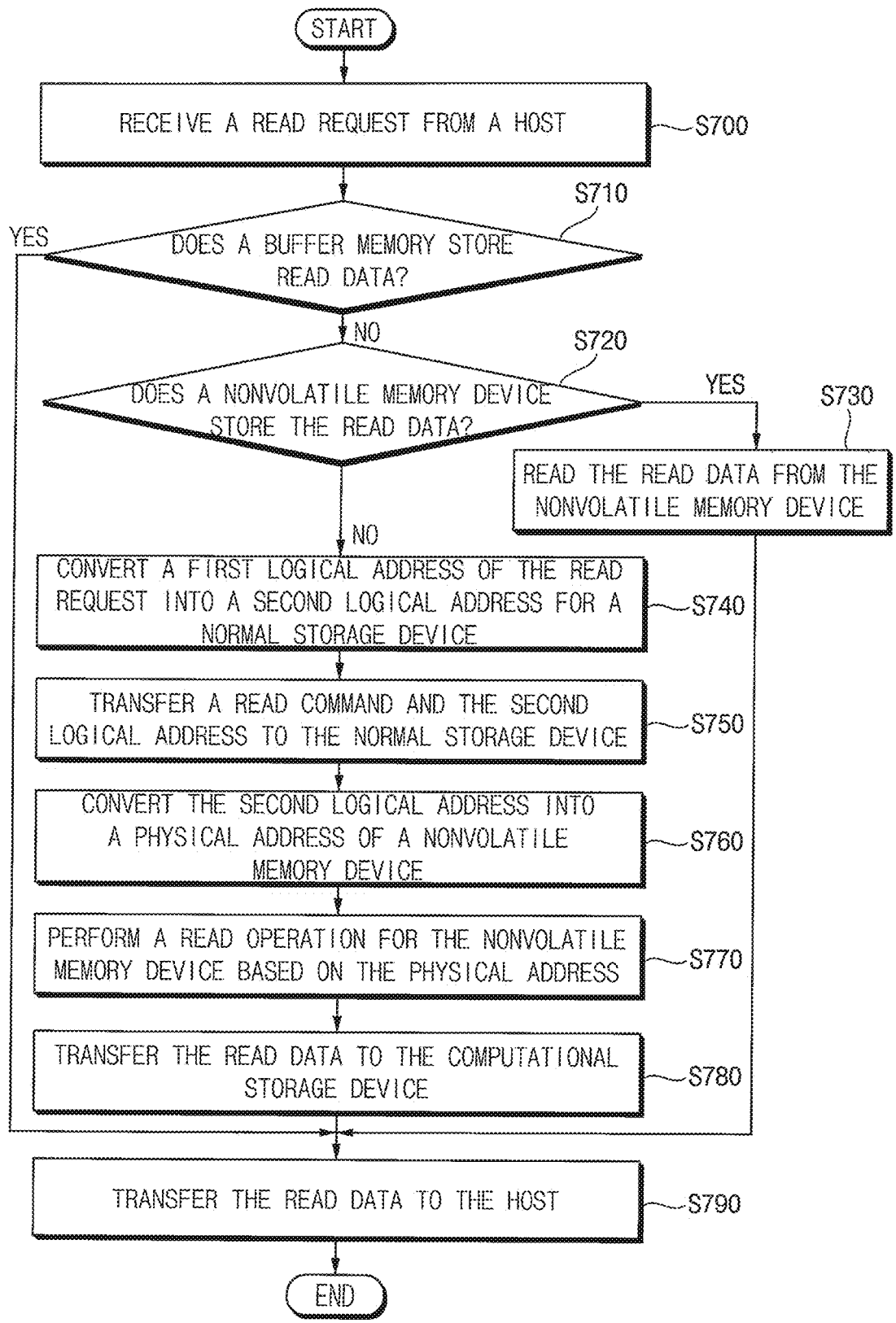
FIG. 10 is a flowchart illustrating a method of reading data in a storage system according to example embodiments.

FIG. 10 is a flowchart illustrating a method of reading data in a storage system according to example embodiments.

Referring to FIGS. 9 and 10, a computational storage device CSD may receive a read request RD_REQ from a host 200 (step S700). The computational storage device CSD may determine whether a buffer memory BM2 of the computational storage device CSD stores read data RDAT requested by the read request RD_REQ (S710). In a case where the read data RDAT are stored in the buffer memory BM2 of the computational storage device CSD (step S710: YES), the computational storage device CSD may provide the host 200 with the read data RDAT stored in the buffer memory BM2 of the computational storage device CSD (step S790).

In a case where the read data RDAT are not stored in the buffer memory BM2 of the computational storage device CSD (step S710: NO), and a nonvolatile memory device NVM2 of the computational storage device CSD is not used as a cache memory, the computational storage device CSD may control a normal storage device SSD1 such that the normal storage device SSD1 performs a read operation that reads the read data RDAT from a nonvolatile memory device NVM1 of the normal storage device SSD1 (step S740 through step S780), and may provide the host 200 with the read data RDAT that are read from the nonvolatile memory device NVM1 of the normal storage device SSD1 (step S790).

In a case where the read data RDAT are not stored in the buffer memory BM2 of the computational storage device CSD (step S710: NO), and the nonvolatile memory device NVM2 of the computational storage device CSD is used as the cache memory, the computational storage device CSD may further determine whether the nonvolatile memory device NVM2 of the computational storage device CSD stores the read data RDAT (step S720). In a case where the read data RDAT are not stored in the buffer memory BM2 of the computational storage device CSD (step S710: NO), but are stored in the nonvolatile memory device NVM2 of the computational storage device CSD (step S720: YES), the computational storage device CSD may read the read data RDAT from the nonvolatile memory device NVM2 of the computational storage device CSD (step S730), and may provide the host 200 with the read data RDAT that are read from the nonvolatile memory device NVM2 of the computational storage device CSD (step S790).

In a case where the read data RDAT are not stored in both of the buffer memory BM2 and the nonvolatile memory device NVM2 of the computational storage device CSD (step S710: NO & step S720: NO), the computational storage device CSD may convert a first logical address of the read request RD_REQ into a second logical address for the normal storage device SSD1 (S740), and may transfer a read command and the second logical address to the normal storage device SSD1 via a network switch NS (step S750). In response to the read command, the normal storage device SSD1 may convert the second logical address into a physical address of the nonvolatile memory device NVM1 of the normal storage device SSD1 by using a mapping table in a buffer memory BM1 of the normal storage device SSD1 (step S760), may perform the read operation that reads the read data RDAT from the nonvolatile memory device NVM1 based on the physical address (step S770), and may transfer the read data RDAT along with the second logical address to the computational storage device CSD (step S780). The computational storage device CSD may convert the second logical address into the first logical address, and may provide the host 200 with the read data RDAT that are read from the nonvolatile memory device NVM1 of the normal storage device SSD1 along with the first logical address (step S790).

Figure 11:
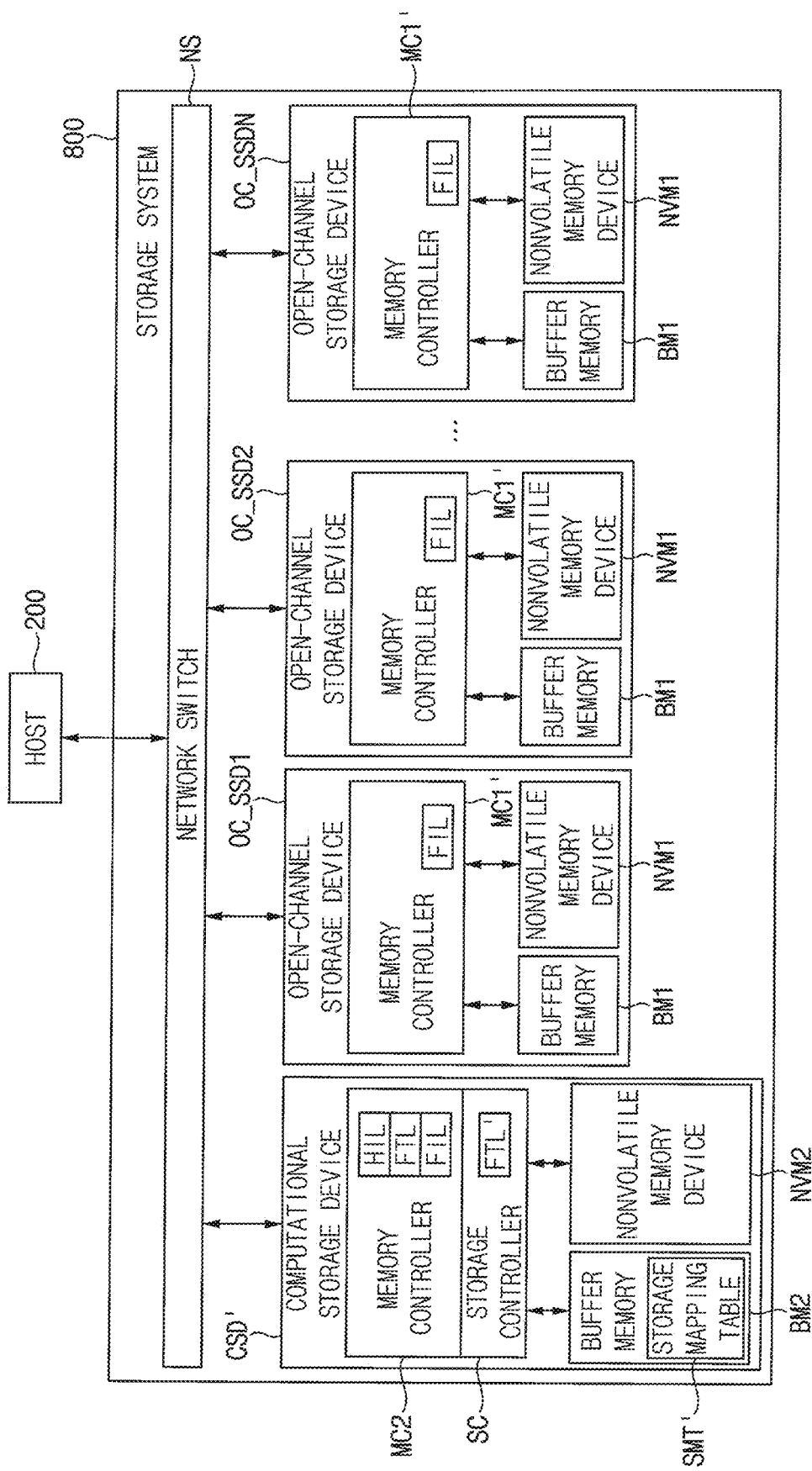
FIG. 11 is a block diagram illustrating a storage system according to example embodiments.

FIG. 11 is a block diagram illustrating a storage system according to example embodiments, and FIG. 12 is a diagram illustrating another example of a storage mapping table included in a buffer memory of a computational storage device.

Referring to FIG. 11, a storage system 800 may include a computational storage device CSD', open-channel storage devices OC_SSD1, OC_SSD2, . . . , OC_SSDN and a network switch NS. The storage system 800 of FIG. 11 may have a similar configuration and a similar operation to a storage system 100 of FIG. 1, except that the storage system 800 may include the open-channel storage devices OC_SSD1, OC_SSD2, . . . , OC_SSDN instead of normal storage devices SSD1, SSD2, . . . , SSDN.

Each open-channel storage device OC_SSD1, OC_SSD2, . . . , OC_SSDN may include a first nonvolatile memory device NVM1, a first buffer memory BM1 and a first memory controller MC1'. The first memory controller MC1' may include a flash interface layer FIL, but may not include a host interface layer HIL and/or a flash translation layer FTL.

The computational storage device CSD' may include a second nonvolatile memory device NVM2, a second buffer memory BM2, a second memory controller MC2 and a storage controller SC. The storage controller SC may execute a flash translation layer FTL' of the open-channel storage devices OC_SSD1, OC_SSD2, . . . , OC_SSDN. In some example embodiments, the flash translation layer FTL' executed by the storage controller SC may perform functions, such as an address mapping operation, a wear-leveling operation, and a garbage collection operation, for the open-channel storage devices OC_SSD1, OC_SSD2, . . . , OC_SSDN.

To perform the address mapping operation, the buffer memory BM2 of the computational storage device CSD' may include a storage mapping table SMT' that is used in converting a logical address for a host 200 into a physical address for the open-channel storage devices OC_SSD1, OC_SSD2, . . . , OC_SSDN. For example, as illustrated in FIG. 12, the storage mapping table SMT' may store the logical address LA for the host 200, a storage identifier representing the open-channel storage device OC_SSD1 in which data corresponding to the logical address LA are stored, and the physical address PA of the first nonvolatile memory device NVM1 of the open-channel storage device OC_SSD1 corresponding to the logical address LA.

Figure 13:
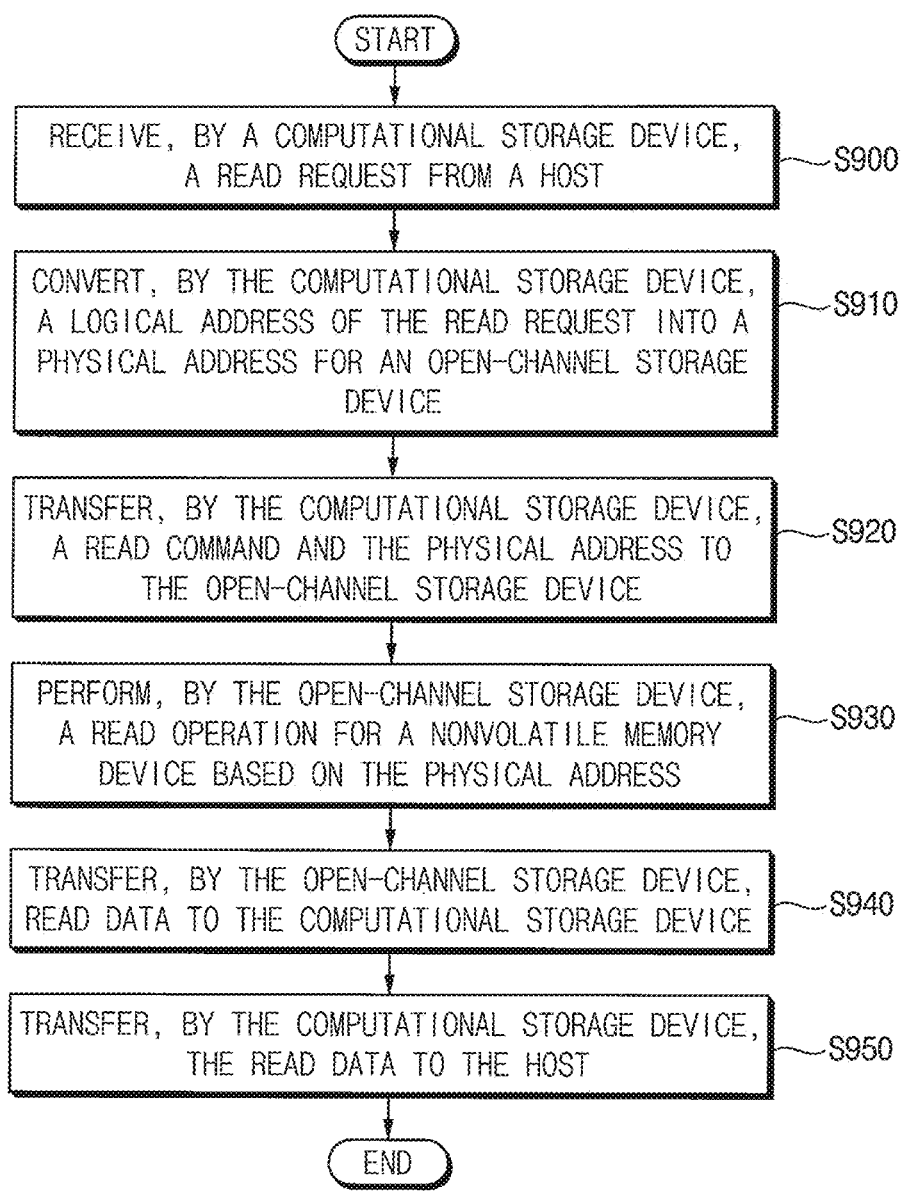
FIG. 13 is a flowchart illustrating a method of reading data in a storage system according to example embodiments.

FIG. 13 is a flowchart illustrating a method of reading data in a storage system according to example embodiments.

Referring to FIGS. 11 and 13, a computational storage device CSD' may receive a read request including a read command and a logical address from a host 200 (step S900). If the read request is received, by using a storage mapping table SMT', the computational storage device CSD' may determine an open-channel storage device OC_SSD1 in which read data requested by the read request are stored, and may convert the logical address of the read request for the host 200 into a physical address of a first nonvolatile memory device NVM1 of the open-channel storage device OC_SSD1 (step S910). The computational storage device CSD' may transfer the read command and the physical address to the open-channel storage device OC_SSD1 via a network switch NS (step S920).

In response to the read command, the open-channel storage device OC_SSD1 may perform a read operation that reads the read data from the first nonvolatile memory device NVM1 based on the physical address received from the computational storage device CSD' (step S930), and may transfer the read data along with the physical address to the computational storage device CSD' (step S940).

The computational storage device CSD' may convert the physical address for the open-channel storage device OC_SSD1 into the logical address for the host 200, and may provide the host 200 with the read data that are read from the first nonvolatile memory device NVM1 of the open-channel storage device OC_SSD1 along with the logical address (step S950).

Figure 14:
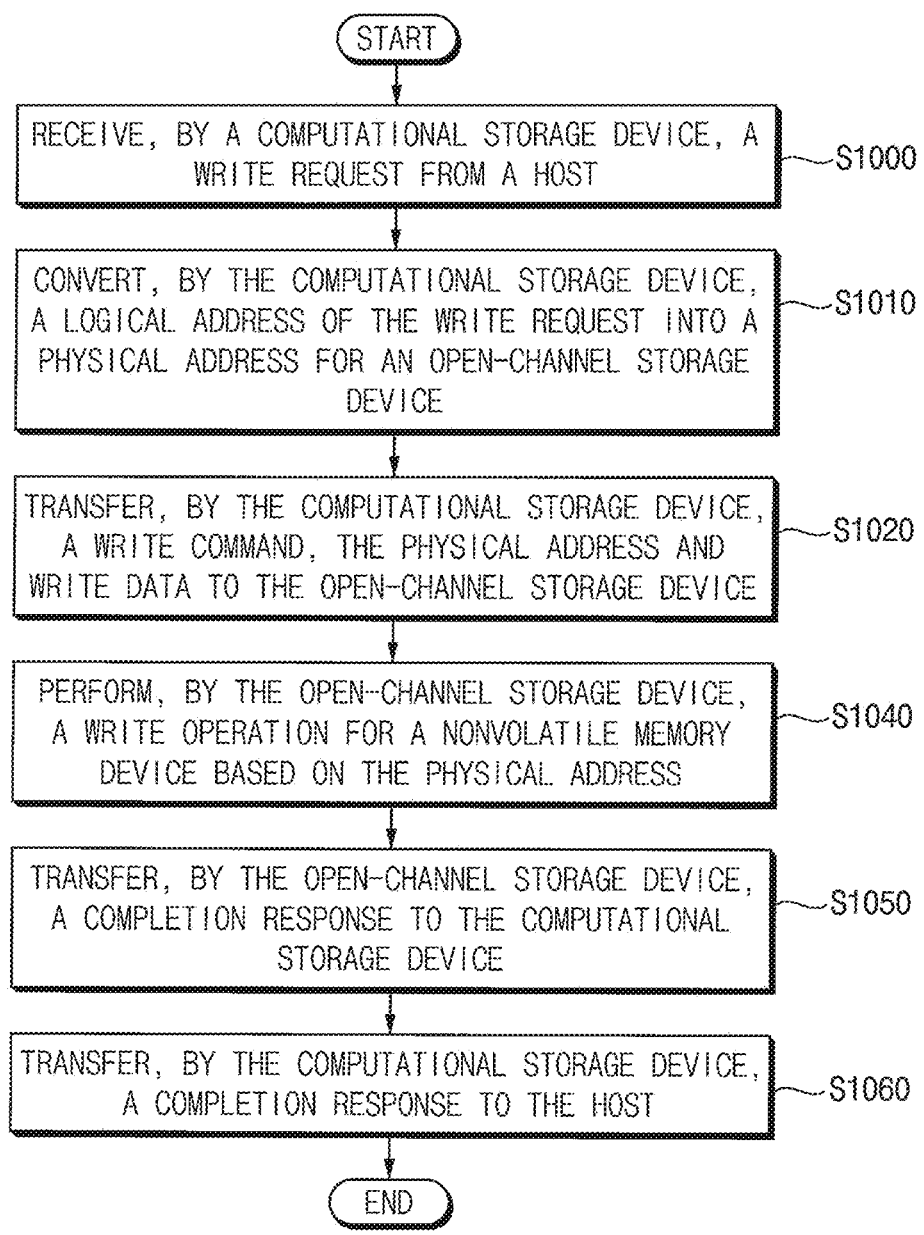
FIG. 14 is a flowchart illustrating a method of reading data in a storage system according to example embodiments.

FIG. 14 is a flowchart illustrating a method of reading data in a storage system according to example embodiments.

Referring to FIGS. 11 and 14, a computational storage device CSD' may receive a write request including a write command, a logical address and write data from a host 200 (step S1000). If the write request is received, the computational storage device CSD' may determine an open-channel storage device OC_SSD1 to which the write data of the write request are to be written, may convert the logical address of the write request for the host 200 into a physical address of a first nonvolatile memory device NVM1 of the open-channel storage device OC_SSD1 (step S1010), and may transfer the write command, the write data and the physical address to the open-channel storage device OC_SSD1 via a network switch NS (step S1020).

In response to the write command, the open-channel storage device OC_SSD1 may perform a write operation that writes the write data to the first nonvolatile memory device NVM1 based on the physical address received from the computational storage device CSD' (step S1040), and may transfer a completion response indicating that the write operation is completed along with the physical address to the computational storage device CSD' (step S1050).

The computational storage device CSD' may convert the physical address for the open-channel storage device OC_SSD1 into the logical address for the host 200, and may provide the host 200 with a completion response indicating that the write operation corresponding to the write request is completed along with the logical address (step S1060).

Figure 15:
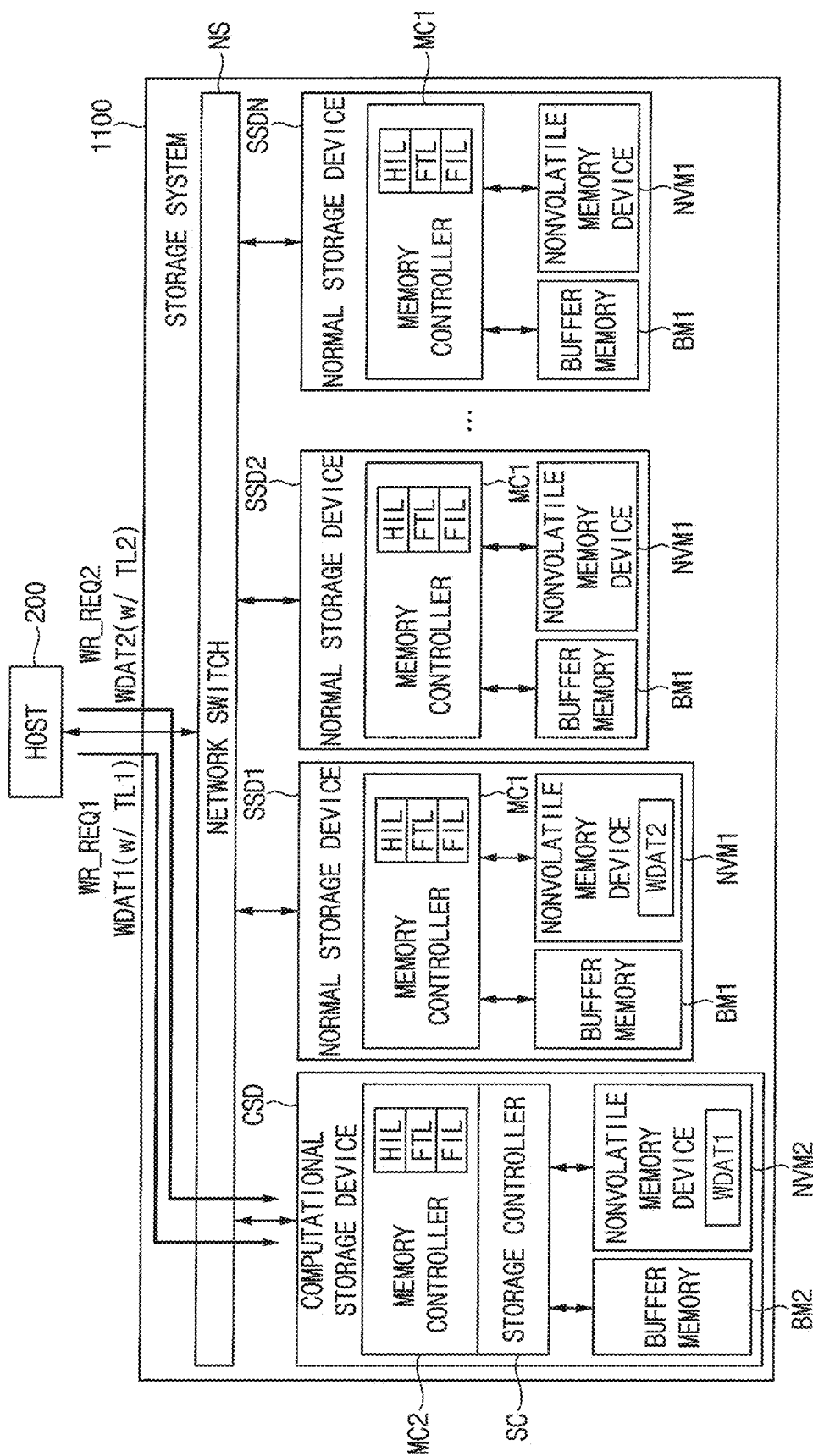
FIG. 15 is a block diagram illustrating a storage system according to example embodiments.

FIG. 15 is a block diagram illustrating a storage system according to example embodiments.

Referring to FIG. 15, a storage system 1100 may include a computational storage device CSD, normal storage devices SSD1, SSD2, ..., SSDN and a network switch NS. The storage system 1100 of FIG. 15 may have a similar configuration and a similar operation to a storage system 100 of FIG. 1, except that write data WDAT1 and WDAT2 are selectively written to a first nonvolatile memory device NVM1 of the normal storage device SSD1 or a second nonvolatile memory device NVM2 of the computational storage device CSD according to a tier level TL1 and TL2.

In some example embodiments, the computational storage device CSD may receive a write request WR_REQ1 and WR_REQ2 including a write command, write data WDAT1 and WDAT2 and a tier level TL1 and TL2 for the write data WDAT1 and WDAT2 from a host 200, and may selectively write the write data WDAT1 and WDAT2 to the first nonvolatile memory device NVM1 of the normal storage device SSD1 or the second nonvolatile memory device NVM2 of the computational storage device CSD according to the tier level TL1 and TL2. For example, in a case where a first write request WR_REQ1 including first write data WDAT1 and a first tier level TL1, the computational storage device CSD may write the first write data WDAT1 to the second nonvolatile memory device NVM2 of the computational storage device CSD. Alternatively, in a case where a second write request WR_REQ2 including second write data WDAT2 and a second tier level TL2, the computational storage device CSD may control the normal storage device SSD1 such that the normal storage device SSD1 writes the second write data WDAT2 to the first nonvolatile memory device NVM1 of the normal storage device SSD1. In some example embodiments, there may be a third tier level TL3, or more as may be desired. In some example embodiments, the tier levels may be determined based on a quality of the data to be stored, a quality of the various storage devices (e.g., the second tier level TL2 may include storage devices with an operation count approaching a threshold level), and/or other criteria, and is not limited to examples described above.

Figure 16:
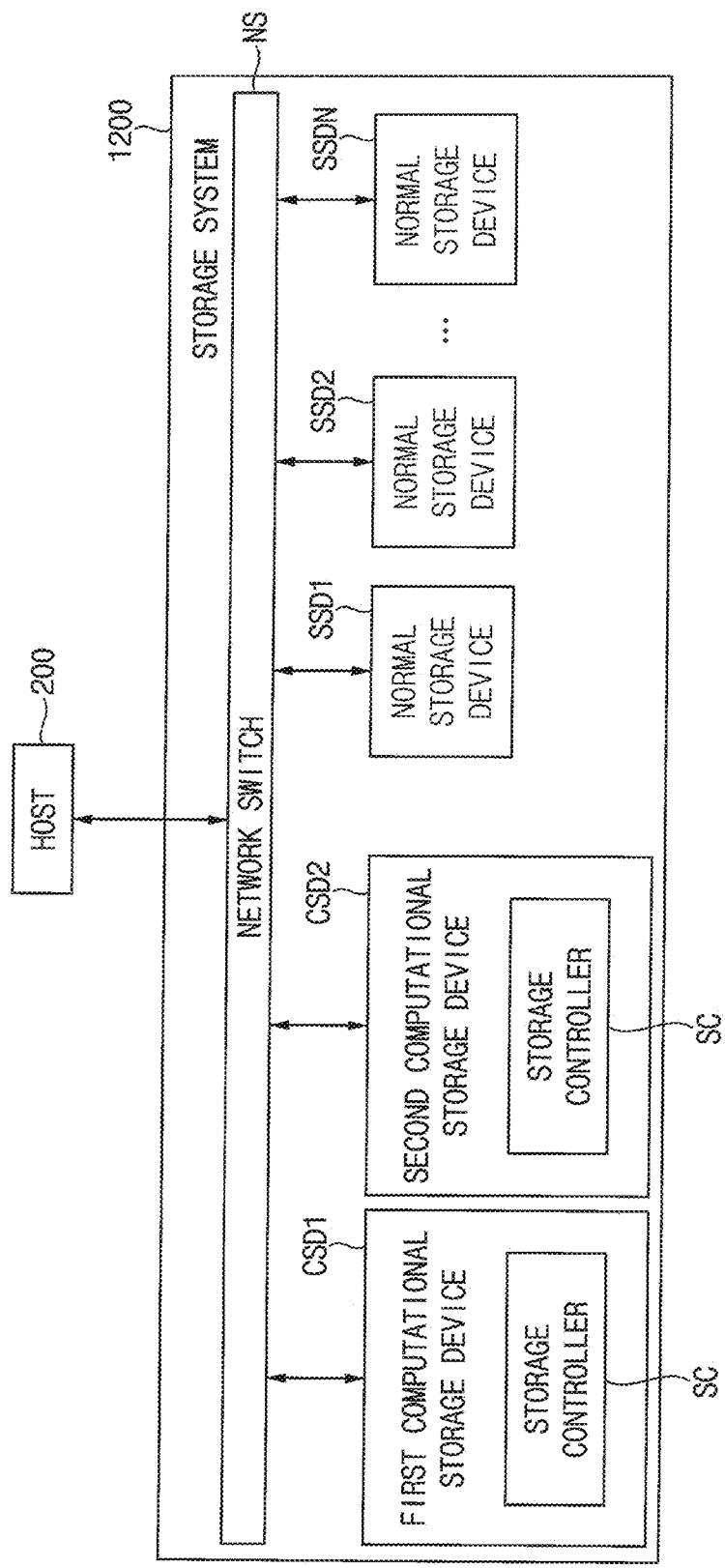
FIG. 16 is a block diagram illustrating a storage system according to example embodiments.

FIG. 16 is a block diagram illustrating a storage system according to example embodiments.

Referring to FIG. 16, a storage system 1200 may include two or more computational storage devices CSD1 and CSD2 each including a storage controller SC, normal storage devices SSD1, SSD2, ..., SSDN and a network switch NS. The storage system 1200 of FIG. 16 may have a similar configuration and a similar operation to a storage system 100 of FIG. 1, except that the storage system 1200 may include the two or more computational storage devices CSD1 and CSD2.

In some example embodiments, a first computational storage device CSD1 may control a portion of the normal storage devices SSD1, SSD2, ..., SSDN, and a second computational storage device CSD2 may control another portion of the normal storage devices SSD1, SSD2, ..., SSDN. In other example embodiments, each of the first and second computational storage devices CSD1 and CSD2 may control all the normal storage devices SSD1, SSD2, ..., SSDN. In still other example embodiments, the first computational storage device CSD1 may control all the normal storage devices SSD1, SSD2, ..., SSDN, and the second computational storage device CSD2 may (e.g., periodically) make a backup of meta data of the first computational storage device CSD1. In this case, if an error or a fault occurs in the first computational storage device CSD1, the second computational storage device CSD2 instead of the first computational storage device CSD1 may control the normal storage devices SSD1, SSD2, ..., SSDN.

Figure 17:
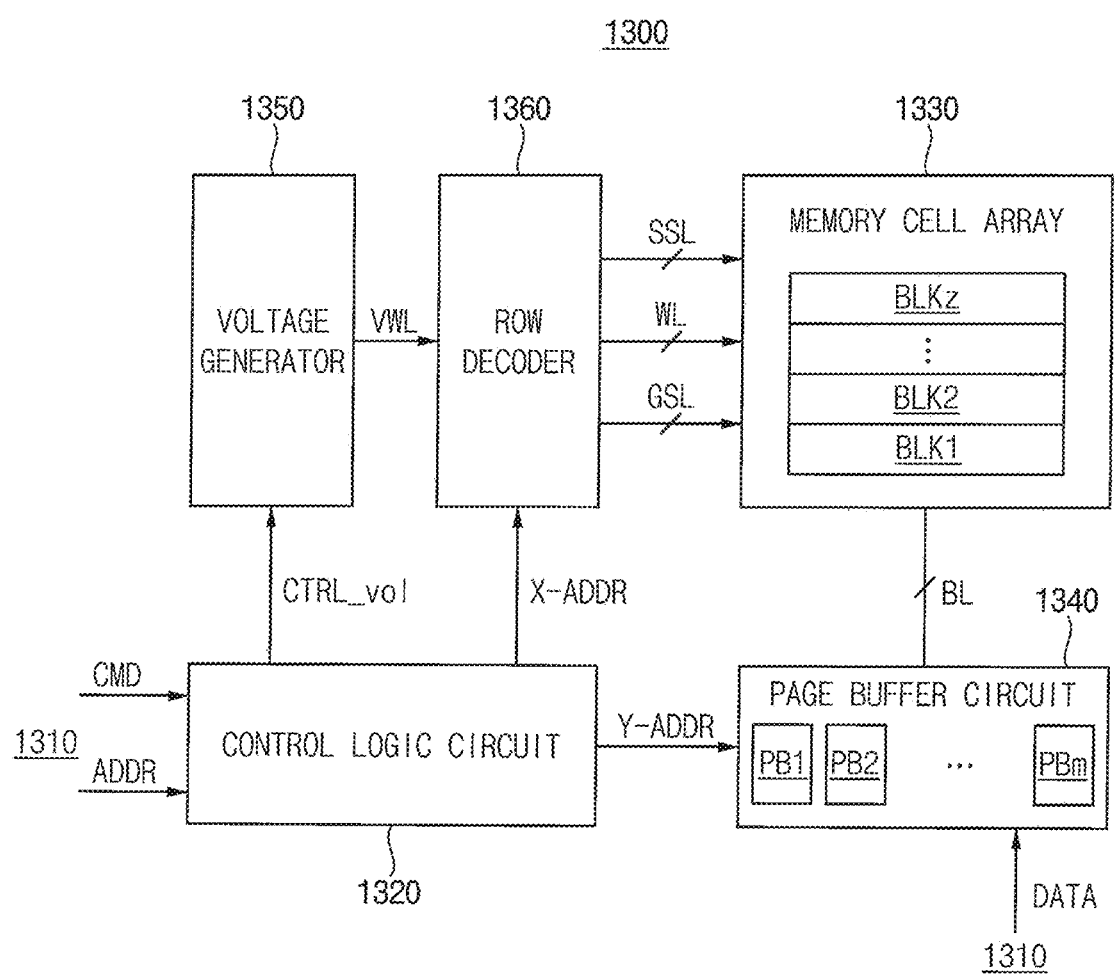
FIG. 17 is a block diagram illustrating an example of a nonvolatile memory device included in each storage device of a storage system according to example embodiments.

FIG. 17 is a block diagram illustrating an example of a nonvolatile memory device included in each storage device of a storage system according to example embodiments.

Referring to FIG. 17, a nonvolatile memory device 1300 may include a memory cell array 1330, and a control circuit that performs an operation for the memory cell array 1330. The control circuit may include a control logic circuit 1320, a page buffer circuit 1340, a voltage generator 1350 and a row decoder 1360. The nonvolatile memory device 1300 may further include an interface circuit 1310. In addition, the nonvolatile memory device 1300 may further include column logic, a pre-decoder, a temperature sensor, a command decoder, and/or an address decoder.

The control logic circuit 1320 may control various operations of the nonvolatile memory device 1300. The control logic circuit 1320 may output various control signals in response to commands CMD and/or addresses ADDR from the interface circuit 1310. For example, the control logic circuit 1320 may output a voltage control signal CTRL_vol to the voltage generator 1350, a row address X-ADDR to the row decoder 1360, and a column address Y-ADDR to the page buffer circuit 1340.

The memory cell array 1330 may include a plurality of memory blocks BLK1 to BLKz (here, z is a positive integer), each of which may include a plurality of memory cells. The memory cell array 1330 may be connected to the page buffer circuit 1340 through bitlines BL and be connected to the row decoder 1360 through wordlines WL, string selection lines SSL, and ground selection lines GSL.

In some example embodiments, the memory cell array 1330 may include a 3D memory cell array, which includes a plurality of NAND strings. Each of the NAND strings may include memory cells respectively connected to wordlines vertically stacked on a substrate. The entire disclosures of U.S. Pat. Nos. 7,679,133; 8,553,466; 8,654,587; 8,559,235; and US Pat. Pub. No. 2011/0233648 are hereby incorporated by reference. In some example embodiments, the memory cell array 1330 may include a 2D memory cell array, which includes a plurality of NAND strings arranged in a row direction and a column direction.

The page buffer circuit 1340 may include a plurality of page buffers PB1 to PBm (here, m is an integer greater than or equal to 3), which may be respectively connected to the memory cells through a plurality of bitlines BL. The page buffer circuit 1340 may select at least one of the bitlines BL in response to the column address Y-ADDR. The page buffer circuit 1340 may operate as a write driver or a sense amplifier according to an operation mode. For example, during a program operation, the page buffer circuit 1340 may apply a bitline voltage corresponding to data to be programmed, to the selected bitline. During a read operation, the page buffer circuit 1340 may sense current or a voltage of the selected bitline BL and sense data stored in the memory cell. The page buffer circuit 1340 may receive data DATA from the interface circuit 1310.

The voltage generator 1350 may generate various kinds of voltages for program, read, and erase operations based on the voltage control signal CTRL_vol. For example, the voltage generator 1350 may generate a program voltage, a read voltage, a program verification voltage, and an erase voltage as a wordline voltage VWL.

The row decoder 1360 may select one of a plurality of wordlines WL and select one of a plurality of string selection lines SSL in response to the row address X-ADDR. For example, the row decoder 1360 may apply the program voltage and the program verification voltage to the selected wordline WL during a program operation and apply the read voltage to the selected word line WL during a read operation.

Figure 18:
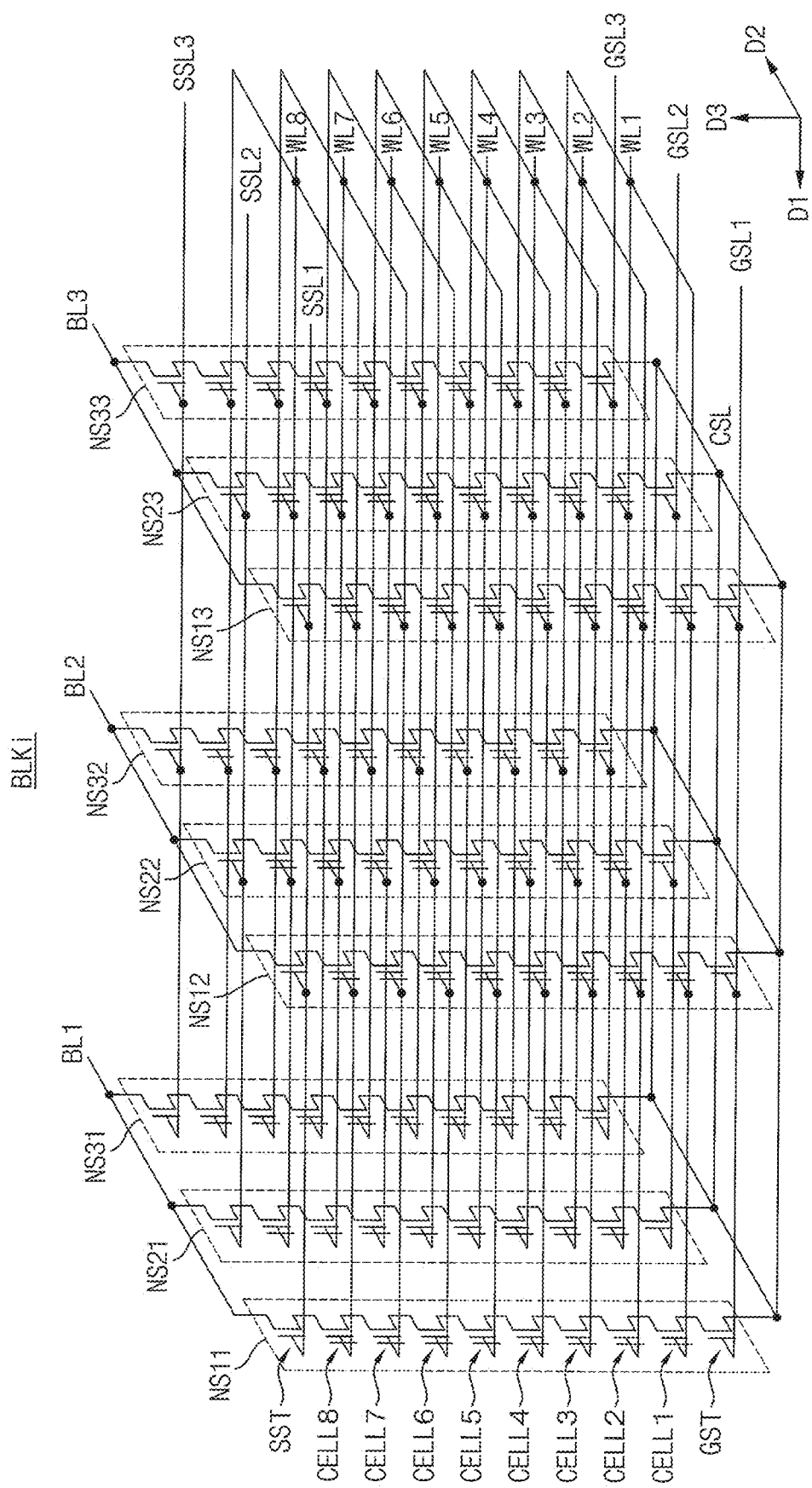
FIG. 18 is a circuit diagram illustrating an equivalent circuit of a memory block described with reference to FIG. 17.

FIG. 18 is a circuit diagram illustrating an equivalent circuit of a memory block described with reference to FIG. 17.

A memory block BLKi shown in FIG. 18 may refer to a 3D memory block having a 3D structure formed on a substrate. For example, a plurality of memory NAND strings included in the memory block BLKi may be formed in a vertical direction to the substrate.

Referring to FIG. 18, the memory block BLKi may include a plurality of memory NAND strings (e.g., NS11, NS12, NS13, NS21, NS22, NS23, NS31, NS32 and NS33), which are connected between bitlines BL1, BL2, and BL3 and a common source line CSL. Each of the memory NAND strings NS11 to NS33 may include a string selection transistor SST, a plurality of memory cells (e.g., CELL1, CELL2, CELL3, CELL4, CELL5, CELL6, CELL7 and CELL8), and a ground selection transistor GST.

The string selection transistor SST may be connected to string selection lines SSL1, SSL2, and SSL3 corresponding thereto. Each of the memory cells CELL1, CELL2, CELL3, CELL4, CELL5, CELL6, CELL7 and CELL8 may be connected to a corresponding one of word lines WL1, WL2, WL3, WL4, WL5, WL6, WL7 and WL8. The ground selection transistor GST may be connected to ground selection lines GSL1, GSL2, and GSL3 corresponding thereto. The string selection transistor SST may be connected to the bitlines BL1, BL2, and BL3 corresponding thereto, and the ground selection transistor GST may be connected to the common source line CSL.

Wordlines (e.g., WL1) at the same level may be connected in common, and the ground selection lines GSL1, GSL2, and GSL3 and the string selection lines SSL1, SSL2, and SSL3 may be separated from each other. FIG. 18 illustrates a case in which a memory block BLKi is connected to eight word lines WL1, WL2, . . . , and WL8 and three bitlines BL1, BL2, and BL3, without being limited thereto.

The inventive concepts may be applied to various storage systems, electronic devices and computing systems. For example, the inventive concepts may be applied to computing systems, such as a personal computer (PC), a server computer, a data center, a workstation, a digital television (TV), a set-top box, a mobile phone, a smart phone, a tablet computer, a laptop computer, a personal digital assistant (PDA), a portable multimedia player (PMP), a digital camera, a camcorder, a portable game console, a music player, a video player, a navigation device, a wearable device, an internet of things (IoT) device, an internet of everything (IoE) device, an e-book reader, a virtual reality (VR) device, an augmented reality (AR) device, a robotic device, a drone, etc.

The storage system 100 (or other circuitry, for example, host 200, network switch NS, computational storage device CSD, memory controller MC2, storage controller SC, buffer memory BM2, nonvolatile memory device NVM2, normal storage device SSD1, or subcomponents thereof) may include hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the example embodiments. Accordingly, all such modifications are intended to be included within the scope of the example embodiments as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A storage system comprising:
a plurality of storage devices, each of the plurality of storage devices including
a nonvolatile memory device,
a buffer memory and
a memory controller configured to control the nonvolatile memory device and the buffer memory, and
at least one storage device of the plurality of storage devices is a computational storage device further including a storage controller configured to perform a computational operation for managing the storage system including a parity generating computational operation for data recovery or a data de-duplication computational operation,
wherein the storage controller is configured such that the computational operation includes generating parity bits in response to performing an operation on user data and storing the user data and the parity bits in at least two of the plurality of storage devices and
wherein the computational storage device is configured to
receive a host request from a host, the host request including a first logical address,
convert the first logical address of the host request to a second logical address of a controlled one of the plurality of storage devices based on a storage identifier, the computational storage device including a storage mapping table which includes the storage identifier linking the first logical address and the second logical address,
control the controlled one of the plurality of storage devices in response to the host request and the second logical address;
control the controlled one of the plurality of storage devices to transmit a completion response based on the host request and the second logical address to the computational storage device;
convert the second logical address to the first logical address; and
transmit the completion response and the first logical address to the host.

2. The storage system of claim 1, wherein the storage controller is further configured to perform a compression computational operation.

3. The storage system of claim 1, wherein the plurality of storage devices other than the computational storage device are normal storage devices that do not include the storage controller, the normal storage devices each including a first nonvolatile memory device, the computational storage device including a second nonvolatile memory device different from the first nonvolatile memory device.

4. The storage system of claim 3, wherein
the computational storage device configured to control the normal storage devices in response to the host request, and
the normal storage devices do not directly receive the host request from the host.

5. The storage system of claim 1, wherein the computational storage device is configured to:
control a normal storage device of the plurality of storage devices in response to the host request being a read request such that the normal storage device performs a read operation that reads read data from the nonvolatile memory device of the normal storage device; and
provide the host with the read data that are read from the nonvolatile memory device of the normal storage device.

6. The storage system of claim 5, wherein
the read request from the host includes a read command and the first logical address, and
the controlled one of the plurality of storage devices is configured to convert the second logical address into a physical address of the nonvolatile memory device of the controlled one of the plurality of storage devices, and perform the read operation based on the physical address.

7. The storage system of claim 6, wherein
the buffer memory of the computational storage device includes the storage mapping table configured to store the storage identifier representing the normal storage device in which the read data are stored, and the second logical address for the normal storage device, and
the computational storage device is configured to convert the first logical address for the host into the second logical address for the controlled one of the plurality of storage devices based on the storage mapping table.

8. The storage system of claim 1, wherein the computational storage device is configured to:
control the controlled one of the plurality of storage devices in response to the host request being a write request including write data such that the controlled one of the plurality of storage devices performs a write operation that writes the write data to the nonvolatile memory device of the controlled one of the storage devices.

9. The storage system of claim 8, wherein
the write request from the host further includes a write command and the first logical address, and
the controlled one of the storage devices is configured to convert the second logical address into a physical address of the nonvolatile memory device of the controlled one of the storage devices, and perform the write operation based on the physical address.

10. The storage system of claim 1, wherein at least one of the buffer memory and the nonvolatile memory device of the computational storage device is configured to function as a cache memory.

11. The storage system of claim 1, wherein the computational storage device is configured to:
determine, based on the request being a read request, whether the buffer memory of the computational storage device stores read data requested by the read request,
wherein, based on the read data being stored in the buffer memory of the computational storage device, the computational storage device is configured to provide the host with the read data stored in the buffer memory of the computational storage device, and
wherein, based on the read data being not stored in the buffer memory of the computational storage device, the computational storage device is configured to control a normal storage device of the plurality of storage devices such that the normal storage device performs a read operation that reads the read data from the nonvolatile memory device of the normal storage device, and provide the host with the read data that are read from the nonvolatile memory device of the normal storage device.

12. The storage system of claim 1, wherein the computational storage device is configured to:
determine based on the host request being a read request, whether the buffer memory of the computational storage device stores read data requested by the read request; and
determine whether the nonvolatile memory device of the computational storage device stores the read data,
wherein, based on the read data being stored in the buffer memory of the computational storage device, the computational storage device is configured to provide the host with the read data stored in the buffer memory of the computational storage device,
wherein, based on the read data not being stored in the buffer memory of the computational storage device, but being stored in the nonvolatile memory device of the computational storage device, the computational storage device is configured to read the read data from the nonvolatile memory device of the computational storage device, and provide the host with the read data that are read from the nonvolatile memory device of the computational storage device, and
wherein, based on the read data not being stored in the buffer memory and the nonvolatile memory device of the computational storage device, the computational storage device is configured to control a normal storage device of the plurality of storage devices such that the normal storage device performs a read operation that reads the read data from the nonvolatile memory device of the normal storage device, and provide the host with the read data that are read from the nonvolatile memory device of the normal storage device.

13. The storage system of claim 1, wherein at least one storage device of the plurality of storage devices other than the computational storage device is an open-channel storage device that does not include the storage controller and does not have a flash translation layer (FTL).

14. The storage system of claim 13, wherein
the computational storage device is configured to receive the host request including a read request including a read command and the first logical address from a host, convert the first logical address into a physical address of the nonvolatile memory device of the open-channel storage device, and provide the read command and the physical address to the open-channel storage device,
the open-channel storage device is configured to perform a read operation that reads read data from the nonvolatile memory device of the open-channel storage device based on the physical address, and transfer the read data to the computational storage device, and
the computational storage device is configured to provide the host with the read data that are read from the nonvolatile memory device of the open-channel storage device.

15. The storage system of claim 14, wherein
the buffer memory of the computational storage device includes the storage mapping table configured to store the storage identifier representing the open-channel storage device in which the read data are stored, and the physical address for the open-channel storage device, and
the computational storage device is configured to convert the first logical address for the host into the second logical address for the open-channel storage device based on the storage mapping table.

16. The storage system of claim 13, wherein
the computational storage device is configured to receive the host request including a write request including a write command, the first logical address and write data from the host, convert the first logical address into a physical address of the nonvolatile memory device of the open-channel storage device, and provide the write command, the physical address, and the write data to the open-channel storage device,
the open-channel storage device is configured to perform a write operation that writes the write data to the nonvolatile memory device of the open-channel storage device based on the physical address, and
the computational storage device is configured to provide the host with t completion response to the write request.

17. The storage system of claim 1, wherein
the computational storage device is configured to receive the host request including a write request including a write command, write data and a tier level for the write data from a host,
wherein, based on the tier level for the write data being a first tier level, the computational storage device is configured to write the write data to the nonvolatile memory device of the computational storage device, and
wherein, based on the tier level for the write data being a second tier level, the computational storage device is configured to control a normal storage device of the plurality of storage devices such that the normal storage device writes the write data to the nonvolatile memory device of the normal storage device.

18. A method of operating a storage system including a computational storage device and normal storage devices, the method comprising:
receiving, by the computational storage device, a host request from a host, the host request including a first logical address;
converting the first logical address of the host request to a second address of at least one of the normal storage devices based on a storage identifier, the computational storage device including a storage mapping table which includes the storage identifier linking the first logical address and the second address; and
controlling, by the computational storage device, the at least one of the normal storage devices in response to the host request and the second address;
transmitting, by the at least one of the normal storage devices, a completion response based on the host request and the second address to the computational storage device;
converting, by the computational storage device, the second address to the first logical address; and
transmitting, by the computational storage device, the completion response and the first logical address to the host.

19. The method of claim 18, wherein receiving the host request includes:
receiving, by the computational storage device, a read request from the host; and
receiving, by the computational storage device, a write request from the host, and
wherein controlling the normal storage devices includes:
controlling, by the computational storage device, a first normal storage device of the normal storage devices in response to the read request such that the first normal storage device performs a read operation that reads read data from a nonvolatile memory device of the first normal storage device; and
controlling, by the computational storage device, a second normal storage device of the normal storage devices in response to the write request such that the second normal storage device performs a write operation that writes write data to a nonvolatile memory device of the second normal storage device.

20. A storage system comprising:
normal storage devices, each of the normal storage devices including a first nonvolatile memory device, a first buffer memory and a first memory controller configured to control the first nonvolatile memory device and the first buffer memory; and
a computational storage device including a second nonvolatile memory device, a second buffer memory, a second memory controller configured to control the second nonvolatile memory device and the second buffer memory, and a storage controller configured to perform a computational operation for managing the storage system,
wherein the computational storage device is configured to receive a read request from a host, the read request including a first read logical address, convert the first read logical address of the read request to a second read address of at least one of the normal storage devices based on a storage identifier, the computational storage device including a storage mapping table which includes the storage identifier linking the first read logical address and second read address, control a first normal storage device of the normal storage devices in response to the read request such that the first normal storage device performs a read operation that reads read data from the second read address of the first nonvolatile memory device of the first normal storage device and provides the computational storage device with the read data from the second read address and the second read address, provide the host with the read data that are read from the first nonvolatile memory device of the first normal storage device and the first logical read address, and
wherein the computational storage device is configured to receive a write request including write data from the host, the write request including a first write logical address, convert the first write logical address of the write request to a second write address of at least one of the normal storage devices, store the storage identifier linking the first write logical address and second write address in the storage mapping table, control a second normal storage device of the normal storage devices in response to the write request such that the second normal storage device performs a write operation that writes the write data to the second write address of the first nonvolatile memory device of the second normal storage device and provides the computational storage device with a completion response and the second write address, and provide the host with the completion response to the write request and the first logical write address.

* * * * *